United States Patent
Minefuji

(10) Patent No.: US 11,550,132 B2
(45) Date of Patent: Jan. 10, 2023

(54) PROJECTION OPTICAL SYSTEM AND PROJECTOR

(71) Applicant: SEIKO EPSON CORPORATION, Tokyo (JP)

(72) Inventor: Nobutaka Minefuji, Omachi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 135 days.

(21) Appl. No.: 16/912,907

(22) Filed: Jun. 26, 2020

(65) Prior Publication Data
US 2020/0409126 A1    Dec. 31, 2020

(30) Foreign Application Priority Data

Jun. 28, 2019  (JP) .............................. JP2019-120998

(51) Int. Cl.
| | | |
|---|---|---|
| *G02B 15/14* | (2006.01) | |
| *G02B 15/177* | (2006.01) | |
| *G02B 27/00* | (2006.01) | |
| *G02B 13/16* | (2006.01) | |

(52) U.S. Cl.
CPC ..... *G02B 15/143507* (2019.08); *G02B 13/16* (2013.01); *G02B 15/177* (2013.01); *G02B 27/0025* (2013.01)

(58) Field of Classification Search
CPC ............ G02B 13/16; G02B 15/143507; G02B 15/177; G02B 27/0025
See application file for complete search history.

(56) References Cited

U.S. PATENT DOCUMENTS

| | | | |
|---|---|---|---|
| 5,724,195 A | 3/1998 | Enomoto et al. | |
| 10,168,609 B2 | 1/2019 | Kuroda | |
| 2004/0032653 A1 | 2/2004 | Gohman | |
| 2005/0286136 A1 | 12/2005 | Masubuchi et al. | |
| 2006/0001985 A1 | 1/2006 | Tada et al. | |
| 2007/0047096 A1 | 3/2007 | Ito et al. | |

(Continued)

FOREIGN PATENT DOCUMENTS

| | | | |
|---|---|---|---|
| JP | H03-241310 A | 10/1991 | |
| JP | H09-127413 A | 5/1997 | |

(Continued)

OTHER PUBLICATIONS

U.S. Appl. No. 16/912,913, filed Jun. 26, 2020 in the name of Nobutaka Minefuji.
Feb. 18, 2021 Office Action issued in U.S. Appl. No. 16/912,913.

*Primary Examiner* — Jack Dinh
(74) *Attorney, Agent, or Firm* — Oliff PLC

(57) ABSTRACT

A projection optical system includes a first lens group having negative power, a second lens group having positive power and disposed at a reduction side of the first lens group, and a third lens group having positive power and disposed at the reduction side of the second lens group. The first lens group includes at least three negative lenses. The second lens group includes at least one positive lens. The third lens group includes a plurality of positive lenses. The at least three negative lenses of the first lens group are each a single lens. The third lens group includes a jointed lens including at least one of the plurality of positive lenses. NA is a reduction-side numerical aperture, Dst is a distortion aberration at a reduction-side maximum image height, and the projection optical system satisfies Conditional Expressions (1) and (2), $$0.2 < NA \qquad (1)$$

$$-45\% < Dst < -10\% \qquad (2).$$

6 Claims, 31 Drawing Sheets

(56) References Cited

U.S. PATENT DOCUMENTS

| | | |
|---|---|---|
| 2007/0268598 A1 | 11/2007 | Kang et al. |
| 2010/0290133 A1 | 11/2010 | Sano et al. |
| 2011/0002046 A1 | 1/2011 | Wada et al. |
| 2011/0032606 A1 | 2/2011 | Imaoka |
| 2014/0063604 A1 | 1/2014 | Iriyama |
| 2017/0108673 A1 | 4/2017 | Ichikawa |
| 2017/0108674 A1 | 4/2017 | Ichikawa |
| 2017/0242220 A1 | 8/2017 | Lee |
| 2017/0254990 A1 | 9/2017 | Noda |
| 2017/0351070 A1 | 12/2017 | Shiokawa |
| 2018/0143411 A1 | 5/2018 | Minefuji |
| 2020/0409126 A1 | 12/2020 | Minefuji |

FOREIGN PATENT DOCUMENTS

| | | |
|---|---|---|
| JP | 2004-333688 A | 11/2004 |
| JP | 2004-354405 A | 12/2004 |
| JP | 2006-017837 A | 1/2006 |
| JP | 2006-098942 A | 4/2006 |
| JP | 2006-523318 A | 10/2006 |
| JP | 2007-310366 A | 11/2007 |
| JP | 2009-186790 A | 8/2009 |
| JP | 2010-266577 A | 11/2010 |
| JP | 2011-013469 A | 1/2011 |
| JP | 2011-053663 A | 3/2011 |
| JP | 2011-059151 A | 3/2011 |
| JP | 2012-123412 A | 6/2012 |
| JP | 2014-048622 A | 3/2014 |
| JP | 2016-038418 A | 3/2016 |
| JP | 2017-161569 A | 9/2017 |
| JP | 2018-084598 A | 5/2018 |
| KR | 2003-0077853 A | 10/2003 |
| WO | 2005/124419 A1 | 12/2005 |
| WO | 2016/021221 A1 | 2/2016 |

PROJECTION OPTICAL SYSTEM AND PROJECTOR

The present application is based on, and claims priority from JP Application Serial Number 2019-120998, filed Jun. 28, 2019, the disclosure of which is hereby incorporated by reference herein in its entirety.

BACKGROUND

1. Technical Field

The present disclosure relates to a projection optical system and a projector including the projection optical system.

2. Related Art

JP-T-2006-523318 describes a projection optical system capable of performing projection on a screen over a short distance to produce a large screen. In the projection optical system described in JP-T-2006-523318, a first optical system relays an image displayed by a light modulator to produce a primary image that is an intermediate image. Further, in the projection optical system, a second optical system produces an enlarged image conjugate with the primary image and projects the enlarged image on the screen.

When the intermediate image is formed in the projection optical system to achieve wide-angle projection, the distortion aberration can be suppressed, but a problem of an increase in the overall length of the optical system and an increase in the diameter thereof occurs.

SUMMARY

A projection optical system according to the present disclosure includes a first lens group having negative power and including at least three negative lenses, a second lens group having positive power and including at least one positive lens, the second group lens disposed at a reduction side of the first lens, and a third lens group having positive power and including a plurality of positive lenses, the third group lens disposed at the reduction side of the second lens. The at least three negative lenses of the first lens group are each a single lens. The third lens group includes a jointed lens including at least one of the plurality of positive lenses. NA is a reduction-side numerical aperture, Dst is a distortion aberration at a reduction-side maximum image height, and the projection optical system satisfies Conditional Expressions (1) and (2) below:

$$0.2 < NA \quad (1)$$

$$-45\% < Dst < -10\% \quad (2).$$

A projector according to the present disclosure includes the projection optical system described above, a light source, and a light modulator disposed in a reduction-side conjugate plane of the projection optical system. The light modulator modulates light emitted from the light source to form a projection image having distortion which corrects a distortion aberration generated in the projection optical system. The projector projects an enlarged image in which the distortion aberration is corrected to an enlargement-side conjugate plane of the projection optical system.

DESCRIPTION OF EXEMPLARY EMBODIMENTS

A projection optical system and a projector according to an embodiment of the present disclosure will be described below with reference to the drawings.

Projector

Figure 1:
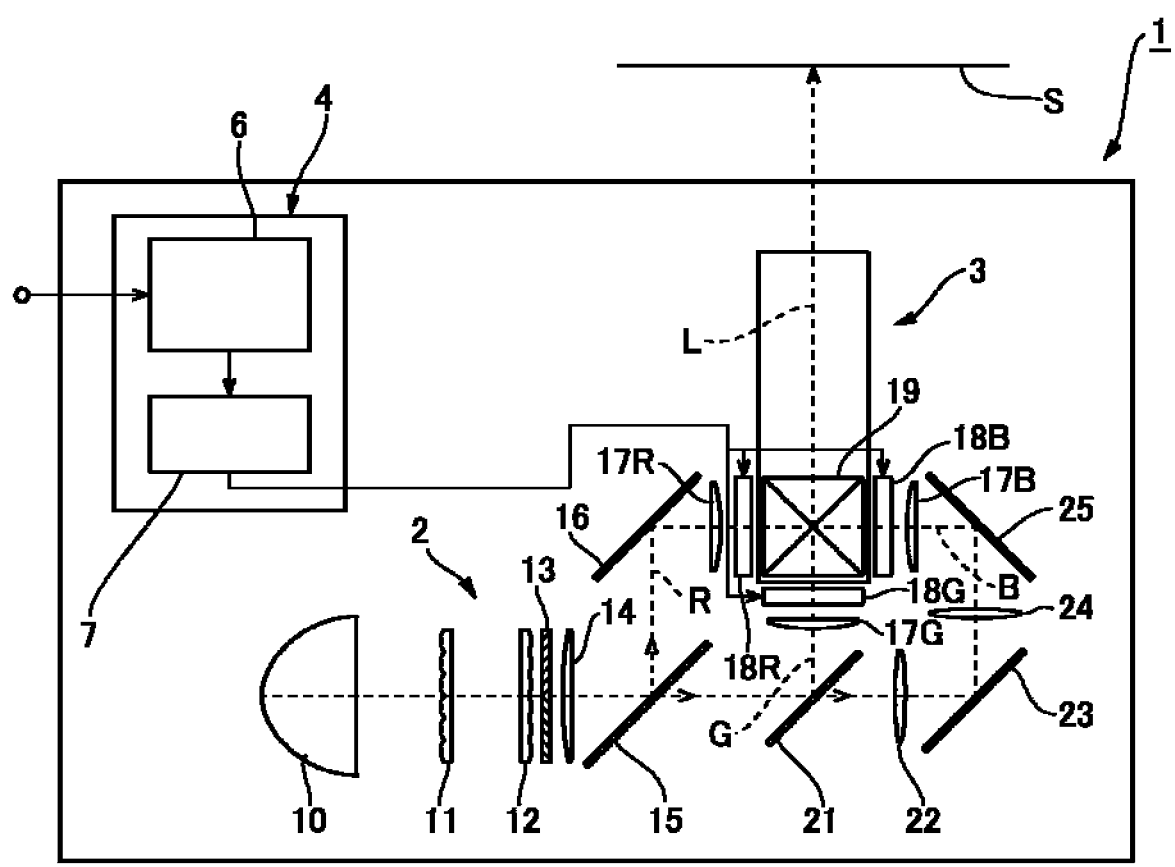
FIG. 1 is a schematic configuration diagram of a projector.

FIG. 1 is a schematic configuration diagram of a projector including a projection optical system 3 according to the present disclosure. The projector 1 includes an image generation optical system 2, which generates a projection image to be projected on a screen S, the projection optical system 3, which enlarges the projection image and projects the enlarged image on the screen S, and a controller 4, which controls the operation of the image generation optical system 2, as shown in FIG. 1.

Image Generation Optical System and Controller

The image generation optical system 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a light flux from the light source 10 into a plurality of light fluxes. The lens elements of the first optical integration lens 11 focus the light fluxes divided from the light flux from the light source 10 in the vicinities of the lens elements of the second optical integration lens 12.

The polarization converter 13 converts the light from the second optical integration lens 12 into predetermined linearly polarized light. The superimposing lens 14 superimposes images of the lens elements of the first optical integration lens 11 on one another via the second optical integration lens 12 in a display area of each of liquid crystal panels 18R, 18G, and 18B, which will be described later.

The image generation optical system 2 further includes a first dichroic mirror 15, a reflection mirror 16, a field lens 17R, and the liquid crystal panel 18R. The first dichroic mirror 15 reflects R light that is part of the light rays incident via the superimposing lens 14 and transmits G light and B light that are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image generation optical system 2 further includes a second dichroic mirror 21, a field lens 17G, and the liquid crystal panel 18G. The second dichroic mirror 21 reflects the G light that is part of the light rays via the first dichroic mirror 15 and transmits the B light that is part of the light rays via the first dichroic mirror 15. The G light reflected off the second dichroic mirror 21 travels via the field lens 17G and is incident on the liquid crystal panel 18G. The liquid crystal panel 18G is a light modulator. The liquid crystal panel 18G modulates the G light in accordance with an image signal to form a green projection image.

The image generation optical system 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround three surfaces of a cross dichroic prism 19. The cross dichroic prism 19 is a light combining prism and generates a projection image that is the combination of the light modulated by the liquid crystal panel 18R, the light modulated by the liquid crystal panel 18G, and the light modulated by the liquid crystal panel 18B.

The cross dichroic prism 19 forms part of the projection optical system 3. The projection optical system enlarges the combined projection image from the cross dichroic prism 19 (combination of images formed by liquid crystal panels 18R, 18G, and 18B) and projects the enlarged projection image on the screen S. The screen S is the enlargement-side conjugate plane of the projection optical system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 processes the image signal inputted from an external apparatus to generate image signals carrying a predetermined distortion aberration. The image processor 6 converts the image signals carrying a predetermined distortion aberration into image signals containing color grayscales and other factors. The display driver 7 operates the liquid crystal panels 18R, 18G, and 18B based on the color image signals outputted from the image processor 6. The image processor 6 thus displays projection images corresponding to the image signals on the liquid crystal panels 18R, 18G, and 18B.

Projection Optical System

The projection optical system 3 will next be described. Examples 1 to 5 will be described below as examples of the configuration of the projection optical system 3 incorporated in the projector 1. In the configuration diagram of the projection optical system in each of Examples, the liquid crystal panels 18R, 18G, and 18B are collectively drawn in the form of a light modulator 18.

Example 1

Figure 2:
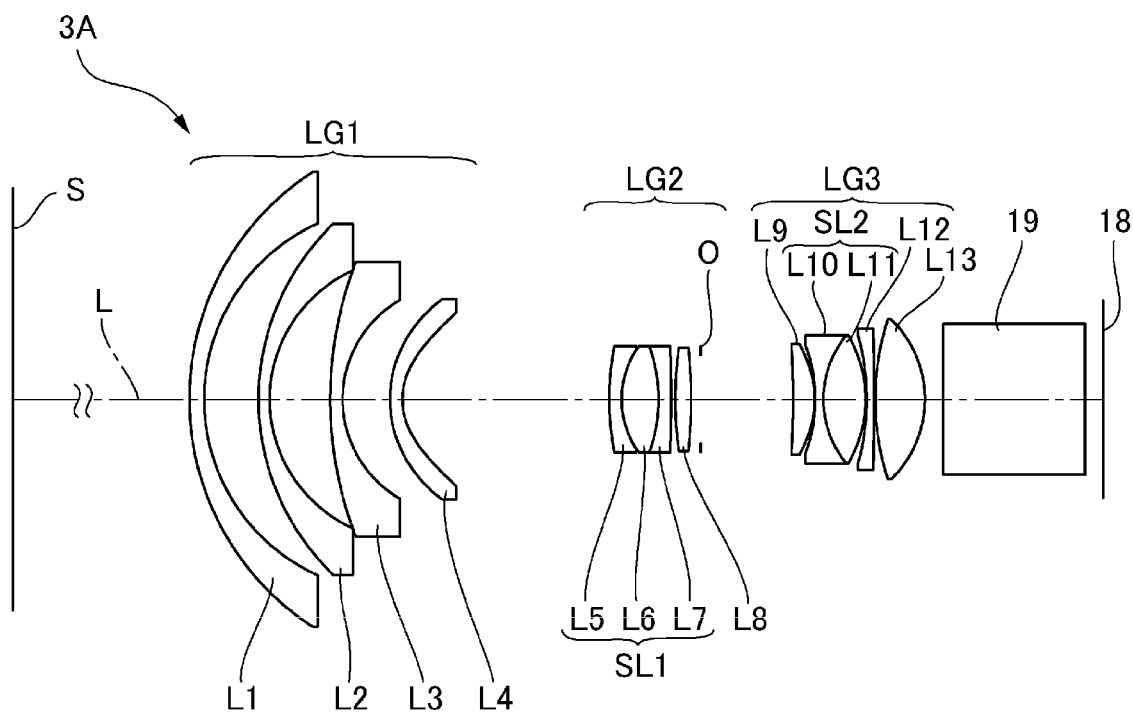
FIG. 2 is a configuration diagram of a projection optical system according to Example 1.

FIG. 2 is a configuration diagram of the projection optical system according to Example 1. A projection optical system 3A according to the present example is formed of the following components sequentially arranged from the enlargement side: a first lens group LG1 having negative power; a second lens group LG2 having positive power; an aperture stop O; and a third lens group LG3 having positive power. The projection optical system 3A includes 13 lenses in total. When the projection distance of the projection optical system 3A is changed, the space between the lens group LG1 and the lens group LG2 is changed for focusing.

The light modulator 18 is located in the reduction-side conjugate plane of the projection optical system 3A. The screen S is located in the enlargement-side conjugate plane of the projection optical system 3A. The projection optical system 3A includes the cross dichroic prism 19 between the light modulator 18 and a reduction-side first lens located in a position closest to the reduction side. The reduction-side first lens is the thirteenth lens L13.

The first lens group LG1 is formed of four negative lenses. The four lenses are each a single lens. Specifically, the first lens group LG1 is formed of a first lens L1 having a convex surface facing the enlargement side and having negative power, a second lens L2 having a convex surface facing the enlargement side and having negative power, a third lens L3 having a convex surface facing the enlargement side and having negative power, and a fourth lens L4 having a convex surface facing the enlargement side and having negative power. The first lens L1 is a glass lens. The first lens L1, the second lens L2, the third lens L3, and the fourth lens L4 each have a meniscus shape. One of the lenses of the first lens group LG1 has an aspheric surface facing the enlargement side. In the present example, the fourth lens L4 has aspheric surfaces on opposite sides.

The second lens group LG2 includes two positive lenses. Specifically, the second lens group LG2 is formed of a fifth lens L5, a sixth lens L6, a seventh lens L7, and an eighth lens L8. The sixth lens L6 and the eighth lens L8 are each a positive lens. The fifth lens L5, the sixth lens L6, and the seventh lens L7 are bonded to each other to form a first jointed lens SL1. The fifth lens L5 has a meniscus shape having a convex surface facing the enlargement side and has negative power. The sixth lens L6 has a convex shape both on the enlargement and reduction sides. The seventh lens L7 has a meniscus shape having a convex surface facing the reduction side. The eighth lens L8 has a convex shape both on the enlargement and reduction sides.

The third lens group LG3 includes a plurality of positive lenses. At least one of the plurality of positive lenses of the third lens group LG3 forms a jointed lens. Further, the thirteenth lens L13, which is located in a position closest to the reduction side in the third lens group LG3, is a positive lens having a convex surface facing the reduction side. In other words, the reduction-side first lens is a positive lens having a convex surface facing the reduction side. That is, the third lens group LG3 is formed of five lenses, the ninth lens L9, the tenth lens L10, the eleventh lens L11, the twelfth lens L12, and the thirteenth lens L13. The eleventh lens L11 and the thirteenth lens L13 are each a positive lens. The eleventh lens L11 along with the tenth lens L10 forms a second jointed lens SL2.

More specifically, the ninth lens L9 has a meniscus shape having a convex surface facing the reduction side. The ninth lens L9 has aspheric surfaces on opposite sides. The tenth lens L10 has a concave shape both on the enlargement and reduction sides and has negative power. The eleventh lens L11 has a convex shape both on the enlargement and reduction sides. The twelfth lens L12 has a meniscus shape having a convex surface facing the reduction side and has negative power. The thirteenth lens L13 has a convex shape both on the enlargement and reduction sides.

Data on the projection optical system 3A are as follows:
f: 5.38;
FNo: 2.00; and
ω: 71.31,
where f denotes the focal length of the entire optical system, FNo denotes the f number thereof, and ω denotes the half angle of view thereof.

Data on the lenses of the projection optical system 3A are as follows: The number in the column labeled with "Lens" denotes the reference character of each of the lenses. STO denotes the aperture stop O. The number 19 represents the cross dichroic prism. A surface having a surface number with * is an aspheric surface. R denotes the radius of curvature. D denotes the on-axis inter-surface space (mm) and represents the lens thickness or the inter-lens space. nd denotes the refractive index at the d line. νd denotes the Abbe number at the d line. The variable space 1 represents the distance between the screen S and the first lens L1. The variable space 2 represents the distance between the first lens group LG1 and the second lens group LG2. The variable space 1 changes in accordance with the projection distance, and the variable space 2 changes in accordance with the focusing performed when the projection distance is changed.

| Lens | Surface number | R | D | nd | νd |
|---|---|---|---|---|---|
|  | 0 |  | Variable space 1 |  |  |
| 1 | 1 | 44.021 | 2.40 | 1.91082 | 35.3 |
|  | 2 | 31.318 | 8.81 |  |  |
| 2 | 3 | 39.417 | 1.80 | 1.81600 | 46.6 |
|  | 4 | 22.895 | 9.89 |  |  |
| 3 | 5 | 62.295 | 2.00 | 1.61800 | 63.3 |
|  | 6 | 18.626 | 7.66 |  |  |
| 4 | 7* | 19.494 | 2.00 | 1.53116 | 56.0 |
|  | 8* | 10.554 | Variable space 2 |  |  |
| 5 | 9 | 45.780 | 2.00 | 1.83400 | 37.2 |
| 6 | 10 | 14.745 | 6.00 | 1.62004 | 36.3 |
| 7 | 11 | −24.938 | 2.00 | 1.83400 | 37.2 |
|  | 12 | −256.847 | 0.67 |  |  |
| 8 | 13 | 57.066 | 2.60 | 1.84666 | 23.8 |
|  | 14 | −71.889 | 1.50 |  |  |
| STO |  | Infinity | 15.00 |  |  |
| 9 | 16* | −239.088 | 3.50 | 1.82115 | 24.1 |
|  | 17* | −15.735 | 0.10 |  |  |
| 10 | 18 | −24.717 | 1.30 | 1.84666 | 23.8 |
| 11 | 19 | 16.315 | 6.84 | 1.49700 | 81.5 |
|  | 20 | −20.569 | 0.20 |  |  |
| 12 | 21 | −38.643 | 1.20 | 1.84666 | 23.8 |
|  | 22 | −358.700 | 0.20 |  |  |
| 13 | 23 | 43.122 | 8.01 | 1.48749 | 70.2 |
|  | 24 | −18.098 | 3.00 |  |  |
| 19 | 25 | Infinity | 23.00 | 1.51633 | 64.1 |
|  | 26 | Infinity | 3.01 |  |  |

The variable spaces 1 and 2 are set as follows in the focusing performed when the projection distance is changed. The projection distance when the variable space 1, which is the distance between the first lens L1 and the screen S, is 500 mm is now defined as a reference distance. The projection distance when the variable space 1 is 1000 mm is defined as a far-projection distance. The projection distance when the variable space 1 is 300 mm is defined as a near-projection distance.

|  | Reference distance | Far-projection distance | Near-projection distance |
|---|---|---|---|
| Variable space 1 | 500.00 | 1000.00 | 300.00 |
| Variable space 2 | 33.51 | 33.38 | 33.62 |

Data on the aspheric surfaces of the fourth lens L4 labeled with the surface numbers 7 and 8 and the aspheric surfaces of the ninth lens L9 labeled with the surface numbers 16 and 17 are as follows. The amount of displacement z of an aspheric surface at a height h from the optical axis is expressed by Expression 1 below.

$$z = \frac{c \cdot h^2}{1 + \sqrt{1 - (k+1)c^2 \cdot h^2}} +$$
$$A04 \cdot h^4 + A06 \cdot h^6 + A08 \cdot h^8 + A10 \cdot h^{10} + A12 \cdot h^{12}$$

where c denotes the curvature, k denotes a conic coefficient, and A04 to A12 denote higher-order aspheric coefficients.

| Surface number | 7 | 8 | 16 | 17 |
|---|---|---|---|---|
| k | 0.0000 | −1.7808 | −0.5950 | −1.6620 |
| A04 | 6.7013E−06 | 8.7386E−05 | −2.1840E−05 | 1.9878E−06 |
| A06 | −4.0543E−08 | −3.3775E−07 | −8.7172E−08 | −1.1155E−07 |
| A08 | 4.3219E−12 | 3.5498E−10 | 9.5653E−11 | 0.0000E+00 |
| A10 | 0.0000E+00 | 0.0000E+00 | 0.0000E+00 | 0.0000E+00 |
| A12 | 0.0000E+00 | 0.0000E+00 | 0.0000E+00 | 0.0000E+00 |

Projection Image and Enlarged Image

Figure 3:
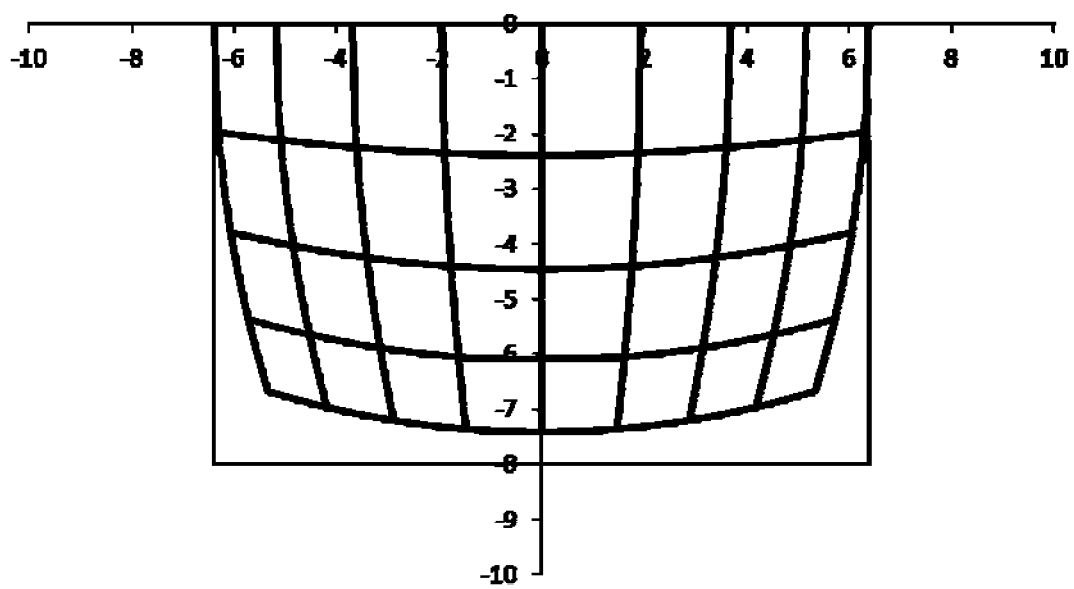
FIG. 3 describes a projection image.
Figure 4:
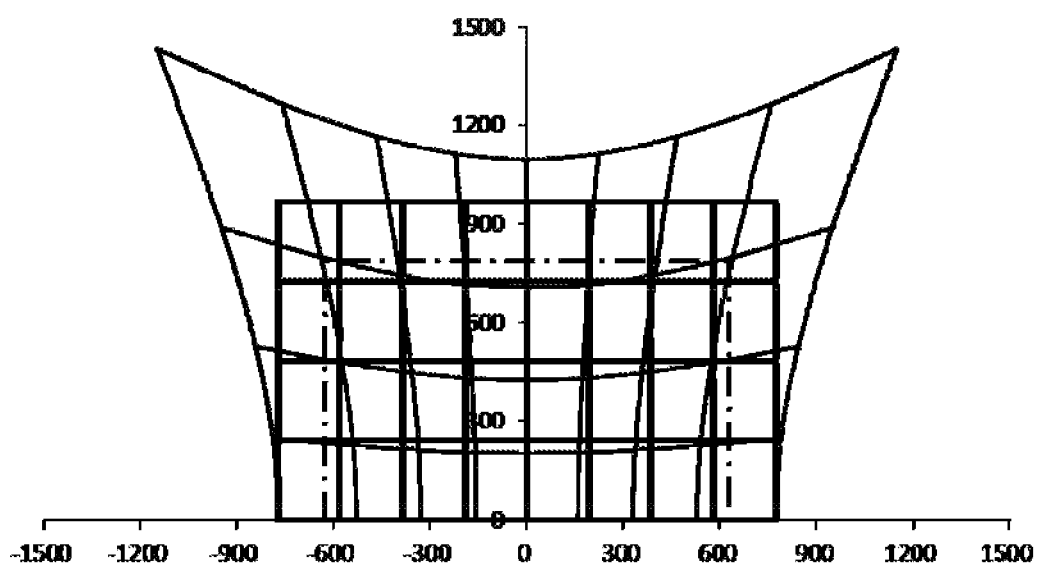
FIG. 4 describes an enlarged image generated when the projection optical system projects the projection image.

The projection image formed by the light modulator 18 and the enlarged image generated when the projection optical system 3A projects the projection image will next be described. FIG. 3 describes the projection image. FIG. 3 shows a case where one long edge of the light modulator 18 so sized that the width and height thereof are 12.8 mm and 8 mm is located on an optical axis L of the projection optical system 3A. The thick lines in FIG. 3 conceptually represent the projection image. The thin line in FIG. 3 represents the image display area of the light modulator 18. FIG. 4 describes the enlarged image generated when the projection image is projected on the screen S via the projection optical system 3A. The thick lines in FIG. 4 conceptually represent the enlarged image generated when the projection image in FIG. 3 is projected on the screen S. The thin line in FIG. 4 conceptually represents the image display area of the light modulator 18 projected on the screen S. The chain line in FIG. 4 conceptually represents the image display area of the light modulator 18 formed when a projection optical system that produces no distortion aberration projects the image display area on the screen S.

The light modulator 18 forms a projection image having distortion that corrects the distortion aberration produced by the projection optical system 3A, as shown in FIG. 3. When the projection optical system 3A projects the projection image on the screen S, an oblong enlarged image having no distortion is formed, as shown in FIG. 4.

The projection image has a shape that allows reduction in trapezoidal distortion of the enlarged image with respect to the ideal oblong image formed on the screen S. That is, the projection image has distortion opposite the trapezoidal distortion of the enlarged image. The projection image is therefore so formed that the shortest edge thereof is the edge having the largest image height on the screen S. That is, the projection image is compressed at the maximum image height in a lower portion of the image display area of the light modulator 18. The projection image has no field curvature. When the projection optical system that produces no distortion is used to project the projection image on the screen S, the image is undesirably smaller than an image formed when the projection optical system 3A according to the present example is used to project the projection image, as indicated by the chain line in FIG. 4. The projection optical system 3A according to the present example can therefore generate a larger enlarged image on the screen S than the enlarged image formed by the projection optical system that has the same focal length but produces no distortion aberration.

The projection optical system 3A according to the present example satisfies Conditional Expressions (1) and (2) below:

$$0.2 < NA \quad (1)$$

$$-45\% < Dst < -10\% \quad (2)$$

where NA denotes the reduction-side numerical aperture, and Dst denotes the distortion aberration at the reduction-side maximum image height. Conditional Expression (1) shows a condition on the brightness of the projection optical system 3A. Conditional Expression (2) shows the condition on the range of the distortion aberration on the reduction side of the entire optical system.

In the present example, NA=0.25 is satisfied, so that Conditional Expression (1) is satisfied. The projection optical system 3A therefore has a large reduction-side numerical aperture and can efficiently capture the light flux outputted from the light modulator 18. That is, when NA in Conditional Expression (1) is smaller than the lower limit, it is difficult to efficiently capture the light flux outputted from the light modulator 18. As a result, it is difficult to generate a sufficiently bright image on the screen. Further, the light that is not allowed to enter the projection optical system 3A is blocked, for example, by an internal frame of the projection optical system 3A, resulting in an increase in the temperature in the projection optical system 3A. When the temperature in the projection optical system. 3A increases, the optical performance of the projection optical system 3A deteriorates in some cases. To solve the problem described above, the projection optical system 3A according to the present example satisfies Conditional Expression (1), allowing suppression of the increase in the temperature in the projection optical system. 3A, whereby the deterioration of the optical performance can be avoided.

Further, in the present example, Dst=−40.0% is satisfied, so that Conditional Expression (2) is satisfied. In the present example, since the distortion aberration at the reduction-side maximum image height satisfies Conditional Expression (2), deterioration of the quality of the enlarged image can be avoided or suppressed. Further, the diameter of the first lens L1 can be reduced, and the number of lenses that form the projection optical system 3A can be reduced. That is, when Dst in Conditional Expression (2) is smaller than the lower limit so that the amount of negative distortion aberration on the reduction side increases, the amount of distortion of the projection image is too large. The quality of the enlarged image therefore deteriorates. On the other hand, when Dst in Conditional Expression (2) is greater than the upper limit so that the amount of negative distortion aberration on the reduction side decreases, it is necessary to increase the diameter of the first lens L1 and increase the number of lenses that form the projection optical system 3A. As a result, the size of the projection optical system 3A increases. Further, the manufacturing cost of the projection optical system 3A increases.

In the present example, the projection image is compressed at the maximum image height in a lower portion of the image display area of the light modulator 18. The amount of information on the image in the lower portion of the image display area of the light modulator 18 is therefore smaller than the amount of information on the original image. As a result, the quality of the enlarged image deteriorates on the screen S. To solve the problem described above, when the distortion aberration at the reduction-side maximum image height satisfies Conditional Expression (2), an excessive decrease in the amount of information on the projection image from the amount of information on the original image can be avoided. The deterioration of the enlarged image on the screen S can therefore be suppressed. When the projector 1 projects, for example, a movie, and captions or any other information is displayed in a portion close to the optical axis on the screen S, that is, in a lower portion of the enlarged image, a decrease in the resolution is small. The captions are therefore legible.

In the present example, the first lens group LG1 includes four negative lenses. The negative lenses are each a single lens. The first lens group LG1 can therefore have a sufficient back focal length and a flat image plane while producing a distortion aberration that falls within the range expressed by Conditional Expression (2).

Further, in the present example, two meniscus lenses are used as the first lens L1 and the second lens L2. Therefore, comma at the periphery of the projection image and astigmatism in the projection image produced by the projection optical system 3A can be suppressed with a wide angle of view, such as ω=71.31, maintained.

The projection optical system 3A according to the present example next satisfies Conditional Expressions (3) and (4) below:

$$0.8<|f1/f|<2.2 \quad (3)$$

$$0.2<|f1/f23|<0.6 \quad (4)$$

when f denotes the focal length of the entire optical system, f1 denotes the focal length of the first lens group LG1, and f23 denotes the combined focal length of the combination of the second lens group LG2 and the third lens group LG3.

In the present example, f=5.400 and f1=−10.917 are satisfied. |f1/f|=2.02 is therefore satisfied, so that Conditional Expression (3) is satisfied. Further, in the present example, f23=30.417 is satisfied. |f1/f23|=0.36 is therefore satisfied, so that Conditional Expression (4) is satisfied. In the present example, when the combined focal length of the combination of the second lens group LG2 and the third lens group LG3 satisfies Conditional Expression (4), the focal length of the entire optical system and the focal length of the first lens group LG1 satisfy Conditional Expression (3), whereby comma and field curvature can be corrected with the distortion aberration maintained at a desired value. Further, a sufficient back focal length can be ensured with a wide angle of view provided. The cross dichroic prism 19 is therefore readily disposed.

That is, when |f1/f| in Conditional Expression (3) is smaller than the lower limit, the focal length of the first lens group LG1 is shorter than the focal length of the entire optical system. As a result, the power of each of the negative lenses of the first lens group LG1 increases, and it is therefore difficult to correct comma and field curvature in a well-balanced manner with the distortion aberration maintained at a desired value. On the other hand, when |f1/f| in Conditional Expression (3) is greater than the upper limit, the focal length of the first lens group LG1 is longer than the focal length of the entire optical system. As a result, the negative power of the first lens group LG1 is too small, and it is therefore difficult to increase the angle of view of the projection optical system 3A and ensure a sufficient back focal length.

The projection optical system 3A further satisfies Conditional Expression (5) below:

$$4.0<f2/f<10.0 \quad (5)$$

where f2 denotes the focal length of the second lens group LG2.

In the present example, f2=40.478 is satisfied. f2/f=7.50 is therefore satisfied, so that Conditional Expression (5) is satisfied. In the present example, Conditional Expression (5) is satisfied, whereby comma and astigmatism can be corrected in a well-balanced manner. That is, when f2/f in Conditional Expression (5) is smaller than the lower limit, the positive power of the second lens group LG2 is too large, and it is therefore difficult to correct comma and astigmatism in a well-balanced manner. When f2/f in Conditional Expression (5) is greater than the upper limit, the positive power of the second lens group LG2 is too small. As a result, the burden on the positive power of the third lens group LG3 undesirably increases, so that a variety of aberrations are likely to occur.

The projection optical system 3A further satisfies Conditional Expressions (6) and (7) below:

$$N>1.65 \quad (6)$$

$$V<35 \quad (7)$$

where N denotes the average of the refractive indices of the positive lenses provided in the second lens group LG2, and V denotes the average of the Abbe numbers thereof.

In the present example, N=1.73 is satisfied, so that Conditional Expression (6) is satisfied. Further, in the present example, V=30.02 is satisfied, so that Conditional Expression (7) is satisfied. In the present example, in which Conditional Expressions (6) and (7) are satisfied, the configuration of the second lens group LG2 can be simplified. Further, occurrence of the chromatic aberration of magnification can be suppressed.

In the present example, the thirteenth lens L13 (reduction-side first lens), which is located in a position closest to the reduction side in the third lens group LG3, is a positive lens having a convex surface facing the reduction side. In the present example, Conditional Expression (8) below is satisfied:

$$2.0<f3/f<6.0 \quad (8)$$

where f3 denotes the focal length of the third lens group LG3.

In the present example, f3=27.960 is satisfied. f3/f=5.18 is therefore satisfied, so that Conditional Expression (8) is satisfied. The projection optical system 3A satisfies Conditional Expression (8) and therefore readily ensures a sufficient back focal length and a reduction-side numerical aperture for capturing the light flux from the light modulator 18.

In the present example, the first lens L1 of the first lens group LG1 is a glass lens having spherical surfaces on the enlargement and reduction sides. When the projector 1 is carried, a hand or any other object may touch the first lens L1 of the projection optical system 3A, and oil, fat, and other types of dirt adhere to the first lens L1 in some cases. In preparation for such cases, the first lens formed of a glass lens has high hardness as compared with a case where the first lens L1 is formed of a plastic lens. Therefore, when the dirt is wiped off or otherwise removed, scratches on the first lens L1 can be suppressed.

Figure 5:
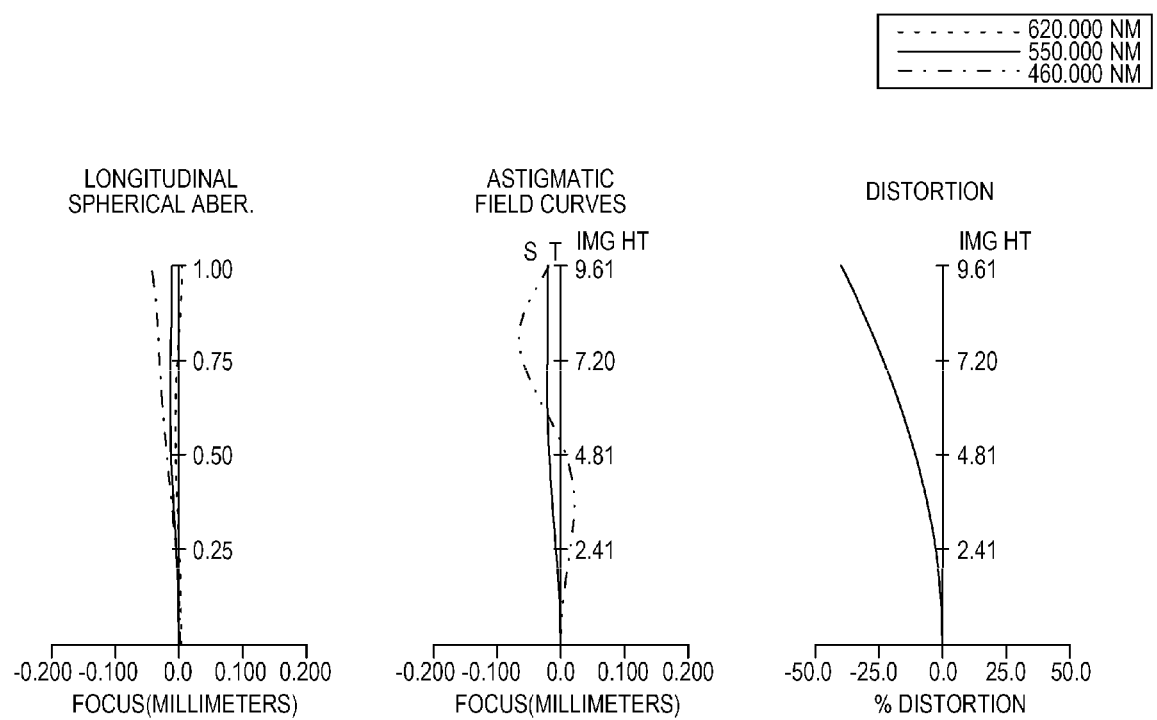
FIG. 5 is an aberration diagram when the projection distance of the projection optical system is a reference distance.
Figure 6:
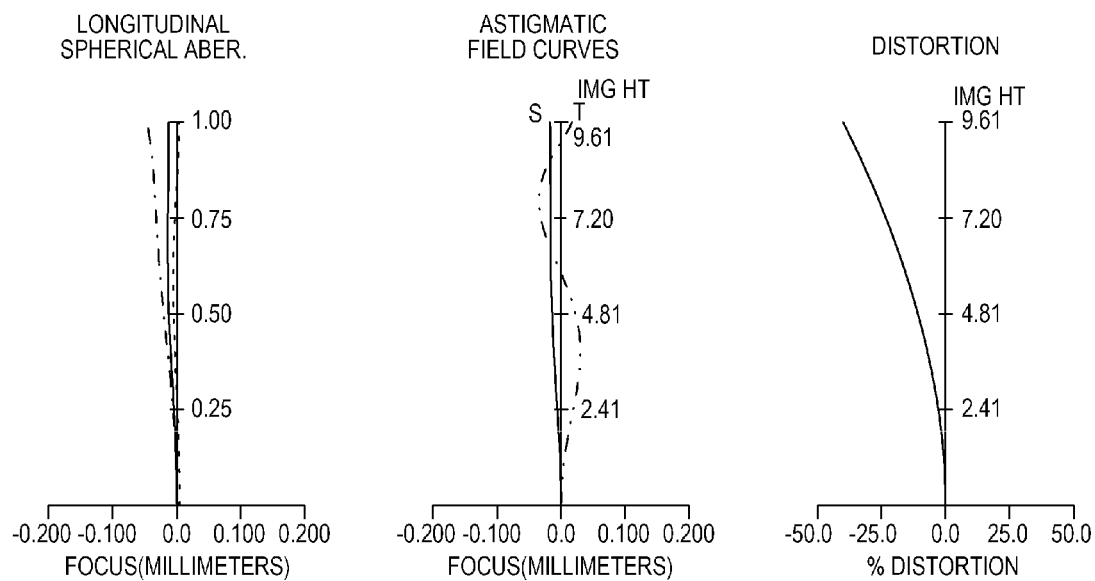
FIG. 6 is an aberration diagram when the projection distance of the projection optical system is a far-projection distance.
Figure 7:
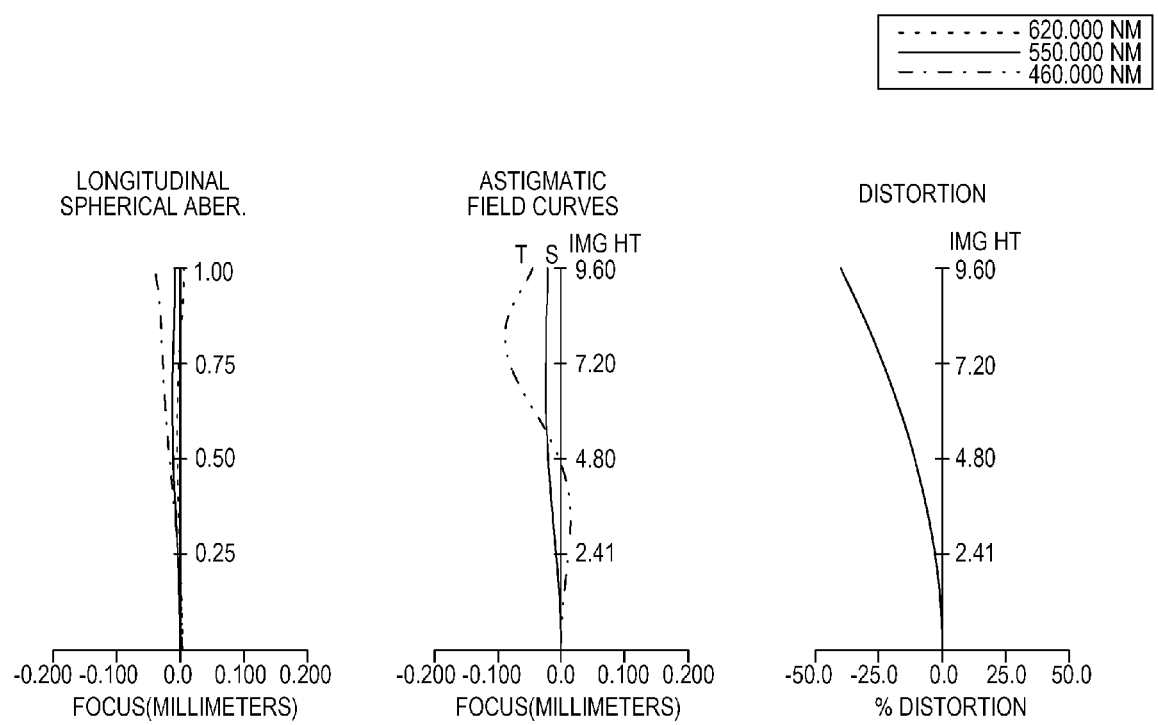
FIG. 7 is an aberration diagram when the projection distance of the projection optical system is a near-projection distance.

FIG. 5 is an aberration diagram when the projection distance of the projection optical system 3A is the reference distance. FIG. 6 is an aberration diagram when the projection distance of the projection optical system 3A is the far-projection distance. FIG. 7 is an aberration diagram when the projection distance of the projection optical system 3A is the near-projection distance. In each of the aberration diagrams of FIGS. 5 to 7, the right figure is a distortion aberration diagram, the middle figure is an astigmatism diagram, and the left figure is a spherical aberration diagram. The spherical aberration, astigmatism, and distortion aberration are satisfactorily corrected in the projection optical system 3A, as shown in the aberration diagrams of FIGS. 5 to 7.

The projection optical system 3A according to the present example forms no intermediate image therein and permits occurrence of the distortion aberration. The size of the projection optical system. 3A can therefore be reduced. On the other hand, the light modulator 18 forms a projection image having distortion that corrects the distortion aberration produced by the projection optical system 3A. The projector 1 can therefore project an enlarged image having a suppressed distortion aberration.

Example 2

Figure 8:
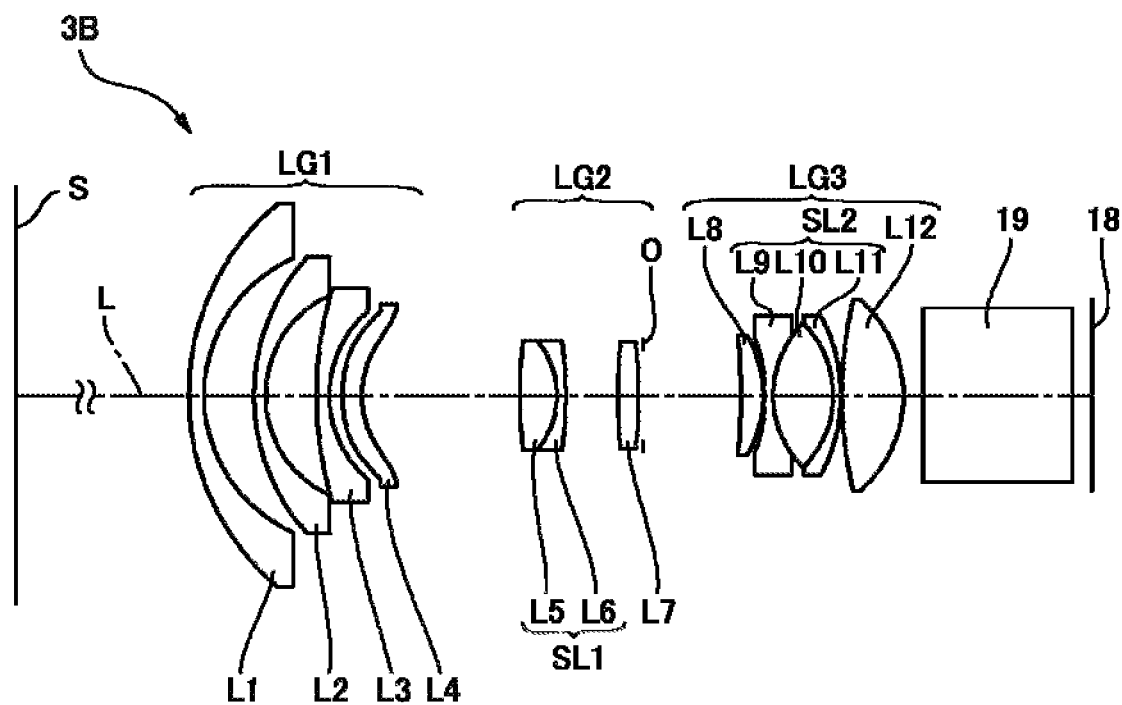
FIG. 8 is a configuration diagram of a projection optical system according to Example 2.

FIG. 8 is a configuration diagram of the projection optical system according to Example 2. A projection optical system 3B according to the present example is formed of the following components sequentially arranged from the enlargement side: a first lens group LG1 having negative power; a second lens group LG2 having positive power; an aperture stop O; and a third lens group LG3 having positive power. The projection optical system. 3B includes 12 lenses in total. The projection optical system 3B includes the cross dichroic prism 19 between the light modulator 18 and a reduction-side first lens located in a position closest to the reduction side. The reduction-side first lens is the twelfth lens L12. When the projection distance of the projection optical system 3B is changed, the space between the entire optical system and the cross dichroic prism 19 is changed for focusing.

The first lens group LG1 includes three negative lenses. The three negative lenses are each a single lens. In the present example, the first lens group LG1 is formed of the three negative lenses and one positive lens. Specifically, the first lens group LG1 is formed of a first lens L1 having a convex surface facing the enlargement side and having negative power, a second lens L2 having a convex surface facing the enlargement side and having negative power, a third lens L3 having a convex surface facing the enlargement side and having negative power, and a fourth lens L4 having a convex surface facing the enlargement side and having positive power. The first lens L1 is a glass lens. The first lens L1, the second lens L2, the third lens L3, and the fourth lens L4 each have a meniscus shape. One of the lenses of the first lens group LG1 has an aspheric surface facing the enlargement side. In the present example, the fourth lens L4 has aspheric surfaces on opposite sides.

The second lens group LG2 includes two positive lenses. Specifically, the second lens group LG2 is formed of a fifth lens L5, a sixth lens L6, and a seventh lens L7. The sixth lens L6 and the seventh lens L7 are each a positive lens. The fifth lens L5 and the sixth lens L6 are bonded to each other to form a first jointed lens SL1. The fifth lens L5 has a convex shape both on the enlargement and reduction sides. The sixth lens L6 has a meniscus shape having a convex surface facing the reduction side and has negative power. The seventh lens L7 has a convex shape both on the enlargement and reduction sides.

The third lens group LG3 includes a plurality of positive lenses. At least one of the plurality of positive lenses of the third lens group LG3 forms a jointed lens. Further, the twelfth lens L12, which is located in a position closest to the reduction side in the third lens group LG3, is a positive lens having a convex surface facing the reduction side. In other words, the reduction-side first lens is a positive lens having a convex surface facing the reduction side. That is, the third lens group LG3 is formed of five lenses, the eighth lens L8, the ninth lens L9, the tenth lens L10, the eleventh lens L11, and the twelfth lens L12. The eighth lens L8, the tenth lens L10, and the twelfth lens L12 are each a positive lens. The following three lenses: the ninth lens L9; the tenth lens L10; and the eleventh lens L11 form a second jointed lens SL2. The eighth lens L8 has a meniscus shape having a convex surface facing the reduction side. The eighth lens L8 has aspheric surfaces on opposite sides. The ninth lens L9 has a concave shape both on the enlargement and reduction sides and has negative power. The tenth lens L10 has a convex shape both on the enlargement and reduction sides and has positive power. The eleventh lens L11 has a meniscus shape having a convex shape on the reduction side and has negative power. The twelfth lens L12 has a convex shape both on the enlargement and reduction sides.

Data on the projection optical system 3B are as follows:
f: 5.8;
FNo: 2.00; and
ω: 68.50,
where f denotes the focal length of the entire optical system, FNo denotes the f number thereof, and ω denotes the half angle of view thereof.

Data on the lenses of the projection optical system 3B are as follows.

| Lens | Surface number | R | D | nd | νd |
|---|---|---|---|---|---|
| | 0 | | Variable space 1 | | |
| 1 | 1 | 38.643 | 2.40 | 1.91082 | 35.3 |
| | 2 | 23.151 | 7.63 | | |
| 2 | 3 | 31.295 | 1.80 | 1.81600 | 46.6 |
| | 4 | 16.762 | 8.00 | | |
| 3 | 5 | 56.489 | 2.00 | 1.62041 | 60.3 |
| | 6 | 17.145 | 2.00 | | |
| 4 | 7* | 22.999 | 3.00 | 1.53116 | 56.0 |
| | 8* | 14.719 | 24.38 | | |
| 5 | 9 | 88.189 | 5.60 | 1.59551 | 39.2 |
| 6 | 10 | −13.469 | 1.40 | 1.74400 | 44.8 |
| | 11 | −56.013 | 8.00 | | |
| 7 | 12 | 84.722 | 3.20 | 1.84666 | 23.8 |
| | 13 | −84.972 | 0.71 | | |
| STO | | Infinity | 15.00 | | |
| 8 | 15* | −184.909 | 3.50 | 1.82115 | 24.1 |
| | 16* | −17.441 | 0.20 | | |
| 9 | 17 | −27.278 | 1.30 | 1.84666 | 23.8 |
| 10 | 18 | 15.804 | 9.23 | 1.49700 | 81.5 |
| 11 | 19 | −15.804 | 1.20 | 1.75520 | 27.5 |
| | 20 | −25.773 | 0.20 | | |

-continued

| Lens | Surface number | R | D | nd | vd |
|---|---|---|---|---|---|
| 12 | 21 | 66.036 | 9.42 | 1.48749 | 70.2 |
|  | 22 | −19.663 | Variable space 2 |  |  |
| 19 | 23 | Infinity | 23.00 | 1.51633 | 64.1 |
|  | 24 | Infinity | 3.02 |  |  |

The variable spaces 1 and 2 are set as follows in the focusing performed when the projection distance is changed.

|  | Reference distance | Far-projection distance | Near-projection distance |
|---|---|---|---|
| Variable space 1 | 500.00 | 1000.00 | 300.00 |
| Variable space 2 | 3.06 | 3.03 | 3.10 |

Data on the aspheric surfaces of the fourth lens L4 labeled with the surface numbers 7 and 8 and the aspheric surfaces of the ninth lens L9 labeled with the surface numbers 15 and 16 are as follows.

| Surface number | 7 | 8 | 15 | 16 |
|---|---|---|---|---|
| k | 0.0000 | −0.6414 | −0.5950 | −1.3452 |
| A04 | 1.4213E−04 | 9.2467E−05 | −2.6157E−05 | −4.1759E−06 |
| A06 | −6.5842E−07 | −8.4732E−07 | −1.0950E−07 | −8.6960E−08 |
| A08 | 2.5622E−09 | 5.8566E−10 | −3.5277E−11 | 0.0000E+00 |
| A10 | −7.4638E−12 | 0.0000E+00 | 0.0000E+00 | 0.0000E+00 |
| A12 | −1.8508E−15 | 0.0000E+00 | 0.0000E+00 | 0.0000E+00 |

Projection Image and Enlarged Image

Figure 9:
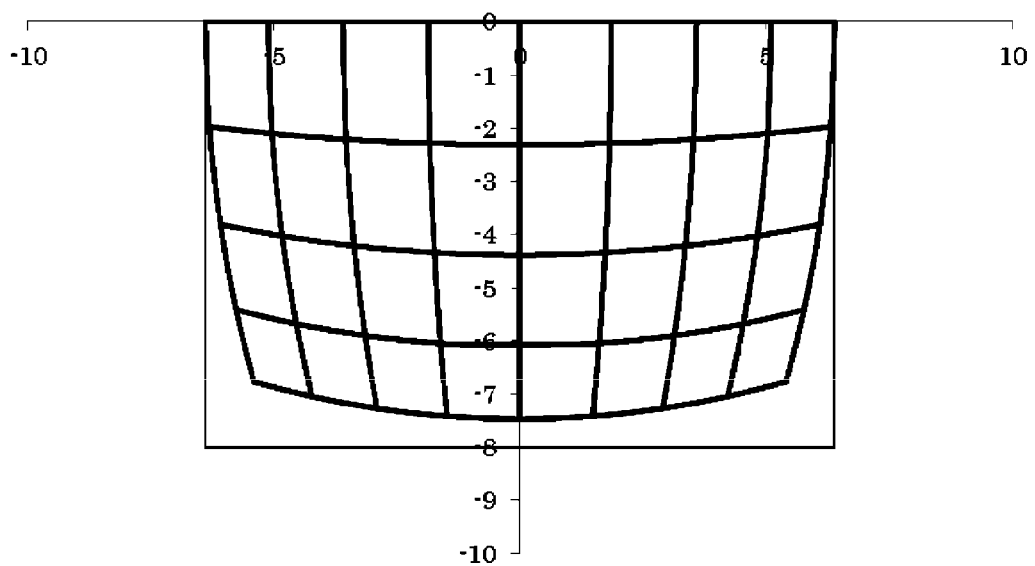
FIG. 9 describes a projection image.
Figure 10:
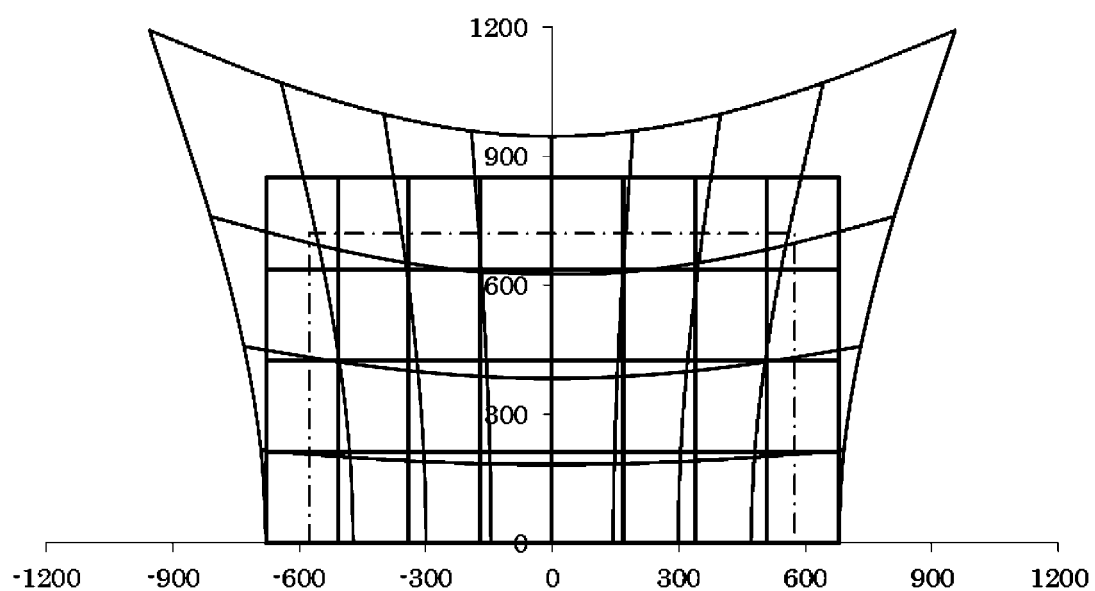
FIG. 10 describes an enlarged image generated when the projection optical system projects the projection image.

FIG. 9 describes the projection image. The thick lines in FIG. 9 conceptually represent the projection image. The thin line in FIG. 9 represents the image display area of the light modulator 18. FIG. 10 describes the enlarged image generated when the projection image is projected on the screen S via the projection optical system 3B. The thick lines in FIG. 10 conceptually represent the enlarged image generated when the projection image in FIG. 9 is projected on the screen S. The thin line in FIG. 10 conceptually represents the image display area of the light modulator 18 projected on the screen S. The chain line in FIG. 10 conceptually represents the image display area of the light modulator 18 formed when a projection optical system that produces no distortion aberration projects the image display area on the screen S.

Also in the present example, when the projection optical system 3B projects the projection image shown in FIG. 9 on the screen S, an oblong enlarged image having no distortion is formed, as shown in FIG. 10. The projection image is compressed at the maximum image height in a lower portion of the image display area of the light modulator 18. The projection image has no field curvature. The projection optical system 3B according to the present example can generate a larger enlarged image on the screen S than the enlarged image formed by the projection optical system that has the same focal length but produces no distortion aberration, as indicated by the chain line in FIG. 10.

The projection optical system 3B according to the present example satisfies Conditional Expressions (1) and (2) below:

$$0.2 < NA \quad (1)$$

$$-45\% < Dst < -10\% \quad (2)$$

where NA denotes the reduction-side numerical aperture, and Dst denotes the distortion aberration at the reduction-side maximum image height.

In the present example, NA=0.25 is satisfied, so that Conditional Expression (1) is satisfied. The projection optical system 3B can therefore efficiently capture the light flux outputted from the light modulator 18. Further, in the present example, Dst=−34.8% is satisfied, so that Conditional Expression (2) is satisfied. Deterioration of the quality of the enlarged image can therefore be avoided or suppressed in the present example. Further, in the projection optical system 3B, the diameter of the first lens L1 can be reduced, and the number of lenses that form the projection optical system 3B can be reduced.

In the present example, the first lens group LG1 includes three negative lenses. The first lens group LG1 can therefore have a sufficient back focal length and a flat image plane while producing a distortion aberration that falls within the range expressed by Conditional Expression (2).

Further, the first lens L1 and the second lens L2 each have a meniscus shape having a convex surface facing the enlargement side. The projection optical system 3B can therefore suppress comma at the periphery of the projection image and astigmatism in the projection image while having a wide angle of view, such as w=68.5.

The projection optical system 3B according to the present example next satisfies Conditional Expressions (3) and (4) below:

$$0.8 < |f1/f| < 2.2 \quad (3)$$

$$0.2 < |f1/f23| < 0.6 \quad (4)$$

where f denotes the focal length of the entire optical system, f1 denotes the focal length of the first lens group LG1, and f23 denotes the combined focal length of the combination of the second lens group LG2 and the third lens group LG3.

In the present example, f=5.800 and f1=−10.254 are satisfied. |f1/f|=1.77 is therefore satisfied, so that Conditional Expression (3) is satisfied. Further, in the present example, f23=35.228 is satisfied. |f1/f23|=0.29 is therefore satisfied, so that Conditional Expression (4) is satisfied. The projection optical system 3B can therefore correct comma and field curvature with the distortion aberration maintained at a desired value. Further, a sufficient back focal length can be ensured with a wide angle of view provided.

The projection optical system 3B further satisfies Conditional Expression (5) below:

$$4.0 < f2/f < 10.0 \quad (5)$$

where f2 denotes the focal length of the second lens group LG2.

In the present example, f2=37.015 is satisfied. f2/f=6.38 is therefore satisfied, so that Conditional Expression (5) is satisfied. The projection optical system 3B can therefore correct comma and astigmatism in a well-balanced manner.

The projection optical system 3B further satisfies Conditional Expressions (6) and (7) below:

$$N>1.65 \quad (6)$$

$$V<35 \quad (7)$$

where N denotes the average of the refractive indices of the positive lenses provided in the second lens group LG2, and V denotes the average of the Abbe numbers thereof.

In the present example, N=1.72 is satisfied, so that Conditional Expression (6) is satisfied. Further, in the present example, V=31.51 is satisfied, so that Conditional Expression (7) is satisfied. The projection optical system 3B can therefore suppress occurrence of the chromatic aberration of magnification.

In the present example, the twelfth lens L12, which is located in a position closest to the reduction side in the third lens group LG3, is a positive lens having a convex surface facing the reduction side. Further, the projection optical system 3B according to the present example satisfies Conditional Expression (8) below:

$$2.0<f3/f<6.0 \quad (8)$$

where f3 denotes the focal length of the third lens group LG3.

In the present example, f3=27.256 is satisfied. f3/f=4.70 is therefore satisfied, so that Conditional Expression (8) is satisfied. The projection optical system 3B therefore readily ensures a sufficient back focal length and a reduction-side numerical aperture for capturing the light flux from the light modulator 18.

In the present example, the first lens L1 of the first lens group LG1 is a glass lens having spherical surfaces on the enlargement and reduction sides. In the present example, the first lens has high hardness, whereby when the dirt is wiped off or otherwise removed, scratches on the first lens L1 can be suppressed.

Figure 11:
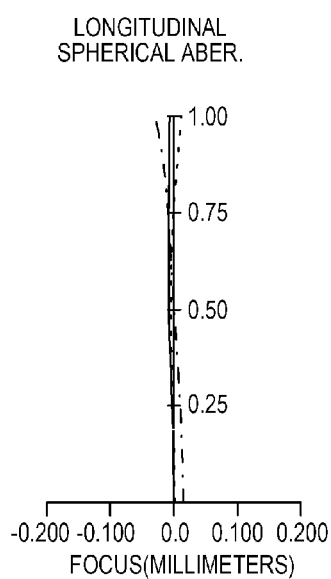
FIG. 11 is an aberration diagram when the projection distance of the projection optical system is the reference distance.
Figure 11:
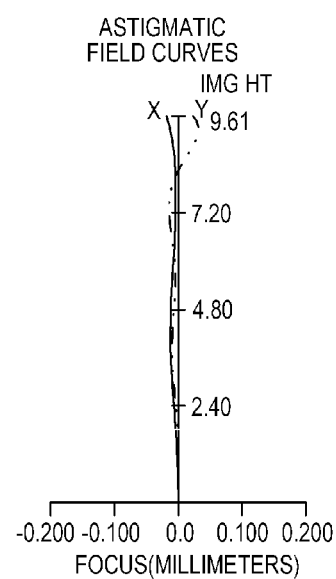
Figure 11:
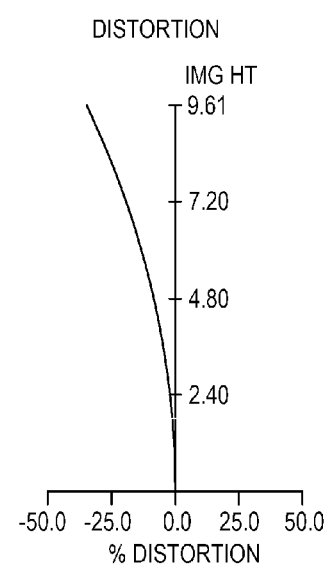
Figure 12:
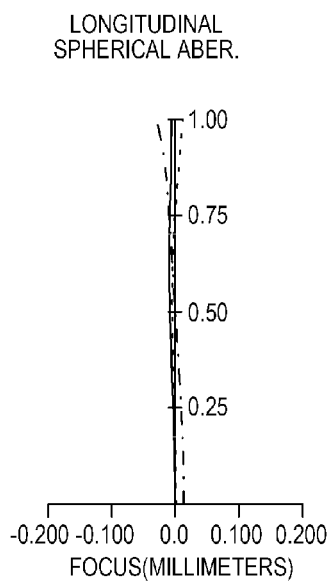
FIG. 12 is an aberration diagram when the projection distance of the projection optical system is the far-projection distance.
Figure 12:
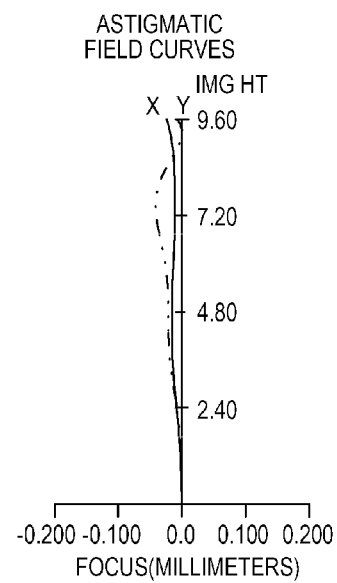
Figure 12:
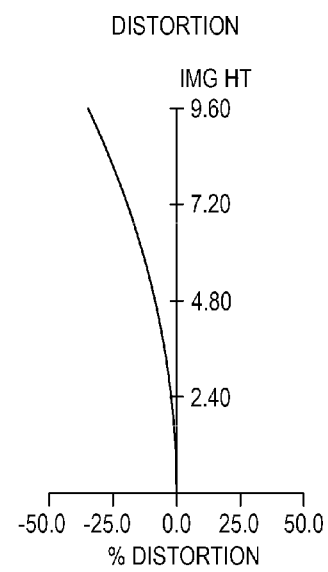
Figure 13:
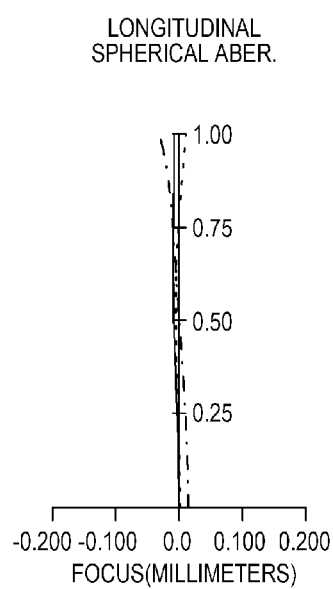
FIG. 13 is an aberration diagram when the projection distance of the projection optical system is the near-projection distance.
Figure 13:
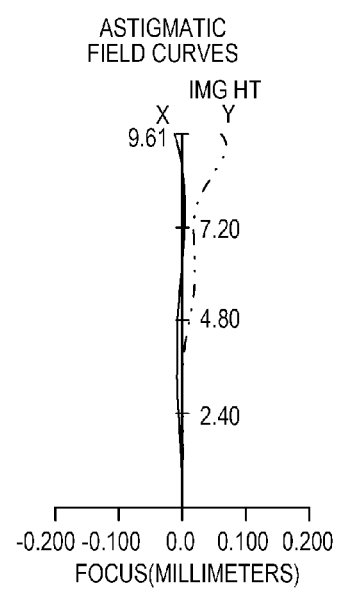
Figure 13:
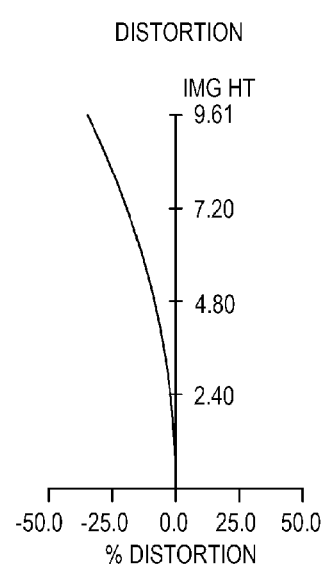

FIG. 11 is an aberration diagram when the projection distance of the projection optical system 3B is the reference distance. FIG. 12 is an aberration diagram when the projection distance of the projection optical system 3B is the far-projection distance. FIG. 13 is an aberration diagram when the projection distance of the projection optical system 3B is the near-projection distance. In each of the aberration diagrams of FIGS. 11 to 13, the right figure is a distortion aberration diagram, the middle figure is an astigmatism diagram, and the left figure is a spherical aberration diagram. The spherical aberration, astigmatism, and distortion aberration are satisfactorily corrected in the projection optical system 3B, as shown in the aberration diagrams of FIGS. 11 to 13.

The projection optical system 3B according to the present example forms no intermediate image therein and permits occurrence of the distortion aberration. The size of the projection optical system. 3B can therefore be reduced. On the other hand, the light modulator 18 forms a projection image having distortion that corrects the distortion aberration produced by the projection optical system 3B. The projector 1 can therefore project an enlarged image having a suppressed distortion aberration.

Example 3

Figure 14:
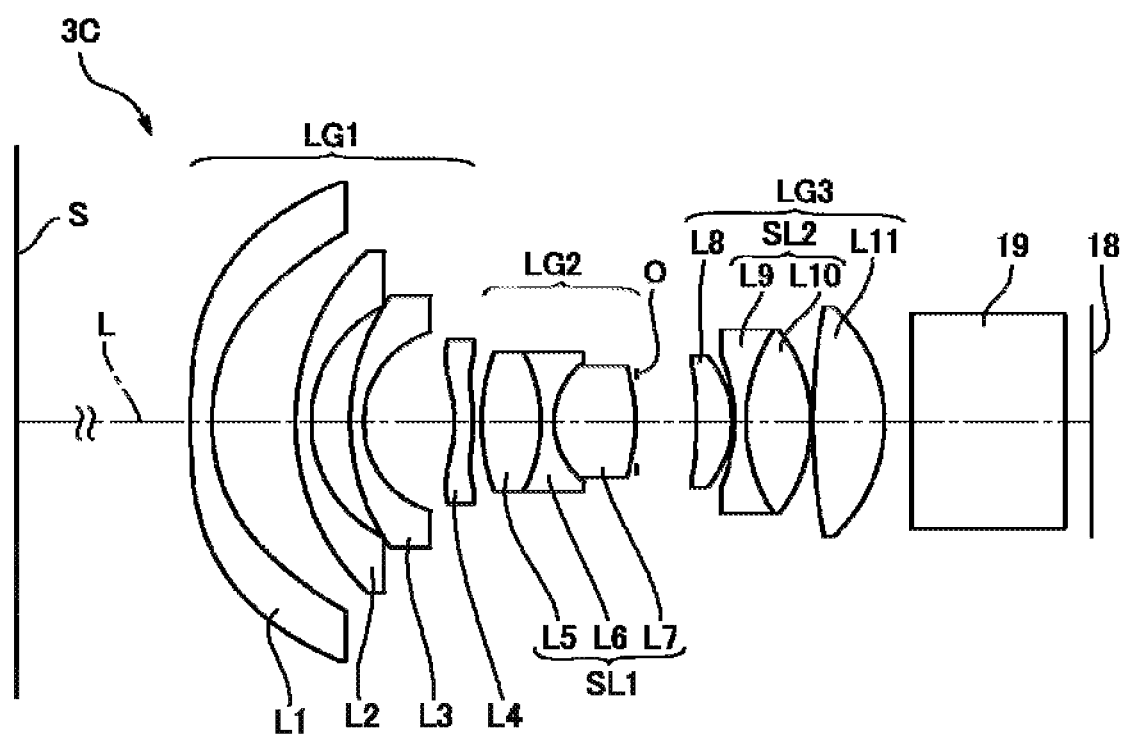
FIG. 14 is a configuration diagram of a projection optical system according to Example 3.

FIG. 14 is a configuration diagram of the projection optical system according to Example 3. A projection optical system 3C according to the present example is formed of the following components sequentially arranged from the enlargement side: a first lens group LG1 having negative power; a second lens group LG2 having positive power; an aperture stop O; and a third lens group LG3 having positive power. The projection optical system 3C includes 11 lenses in total. The projection optical system. 3C includes the cross dichroic prism 19 between the light modulator 18 and a reduction-side first lens located in a position closest to the reduction side. The reduction-side first lens is the eleventh lens L11. When the projection distance of the projection optical system 3C is changed, the space between the entire optical system and the cross dichroic prism 19 is changed for focusing.

The first lens group LG1 is formed of four negative lenses. The four lenses are each a single lens. Specifically, the first lens group LG1 is formed of a first lens L1 having a convex surface facing the enlargement side and having negative power, a second lens L2 having a convex surface facing the enlargement side and having negative power, a third lens L3 having a convex surface facing the enlargement side and having negative power, and a fourth lens L4 having a convex shape in the vicinity of the optical axis both on the enlargement and reduction sides. The first lens L1, the second lens L2, the third lens L3, and the fourth lens L4 each have a meniscus shape. The first lens L1 is a plastic lens. One of the lenses of the first lens group LG1 has an aspheric surface facing the enlargement side. In the present example, the first lens L1 has aspheric surfaces on opposite sides. Further, the fourth lens L4 has aspheric surfaces on opposite sides.

The second lens group LG2 includes two positive lenses. Specifically, the second lens group LG2 is formed of a fifth lens L5, a sixth lens L6, and a seventh lens L7. The fifth lens L5 and the seventh lens L7 are each a positive lens. The fifth lens L5, the sixth lens L6, and the seventh lens L7 are bonded to each other to form a first jointed lens SL1. The fifth lens L5 has a convex shape both on the enlargement and reduction sides. The sixth lens L6 has a concave shape both on the enlargement and reduction sides and has negative power. The seventh lens L7 has a convex shape both on the enlargement and reduction sides.

The third lens group LG3 includes a plurality of positive lenses. At least one of the plurality of positive lenses of the third lens group LG3 forms a jointed lens. Further, the eleventh lens L11, which is located in a position closest to the reduction side in the third lens group LG3, is a positive lens having a convex surface facing the reduction side. In other words, the reduction-side first lens is a positive lens having a convex surface facing the reduction side. Specifically, the third lens group LG3 is formed of four lenses, the eighth lens L8, the ninth lens L9, the tenth lens L10, and the eleventh lens L11. The eighth lens L8, the tenth lens L10, and the eleventh lens L11 are each a positive lens. The ninth lens L9 and the tenth lens L10 form a second jointed lens SL2. More specifically, the eighth lens L8 has a meniscus shape having a convex surface facing the reduction side and has positive power. The eighth lens L8 has aspheric surfaces on opposite sides. The ninth lens L9 has a concave shape both on the enlargement and reduction sides and has negative power. The tenth lens L10 has a convex shape both on the enlargement and reduction sides. The eleventh lens L11 has a convex shape both on the enlargement and reduction sides.

Data on the projection optical system 3C are as follows:

f: 4.8;
FNo: 2.00; and
ω: 69.19, where f denotes the focal length of the entire optical system, FNo denotes the f number thereof, and ω denotes the half angle of view thereof.

Data on the lenses of the projection optical system 3C are as follows.

| Lens | Surface number | R | D | nd | vd |
|---|---|---|---|---|---|
| | 0 | | Variable space 1 | | |
| 1 | 1* | 108.133 | 2.40 | 1.53116 | 56.0 |
| | 2* | 23.876 | 9.22 | | |
| 2 | 3 | 26.329 | 1.80 | 1.85150 | 40.8 |
| | 4 | 14.216 | 4.31 | | |
| 3 | 5 | 23.868 | 1.50 | 1.84666 | 23.8 |
| | 6 | 10.312 | 10.07 | | |
| 4 | 7* | −11.714 | 2.00 | 1.53116 | 56.0 |
| | 8* | −22.47 | 1.00 | | |
| 5 | 9 | 22.338 | 6.55 | 1.68893 | 31.1 |
| 6 | 10 | −16.512 | 1.50 | 1.83481 | 42.7 |
| 7 | 11* | 8.32 | 8.99 | 1.72825 | 28.5 |
| | 12* | −20.157 | 0.10 | | |
| STO | | Infinity | 6.66 | | |
| 8 | 14* | −58.391 | 4.00 | 1.58913 | 61.2 |
| | 15* | −10.171 | 0.20 | | |
| 9 | 16 | −19.302 | 1.30 | 1.84666 | 23.8 |
| 10 | 17 | 18.297 | 7.20 | 1.49700 | 81.5 |
| | 18 | −16.460 | 0.20 | | |
| 11 | 19 | 65.556 | 8.00 | 1.48749 | 70.2 |
| | 20 | −17.084 | Variable space 2 | | |
| 19 | 21 | Infinity | 17.00 | 1.51633 | 64.1 |
| | 22 | Infinity | 2.99 | | |

The variable spaces 1 and 2 are set as follows in the focusing performed when the projection distance is changed.

| | Reference distance | Far-projection distance | Near-projection distance |
|---|---|---|---|
| Variable space 1 | 400.00 | 1000.00 | 200.00 |
| Variable space 2 | 3.06 | 3.02 | 3.11 |

Data on the aspheric surfaces of the first lens L1 labeled with the surface numbers 1 and 2, the aspheric surfaces of the fourth lens L4 labeled with the surface numbers 7 and 8, and the aspheric surfaces of the eighth lens L8 labeled with the surface numbers 14 and 15 are as follows.

| Surface number | 1 | 2 | 7 | 8 | 14 | 15 |
|---|---|---|---|---|---|---|
| k | 0.0000 | 0.0000 | 0.0000 | −1.0000 | −1.0000 | −0.4837 |
| A04 | 4.5940E−05 | 4.0982E−05 | 6.9832E−04 | 5.6804E−04 | −1.1046E−04 | 4.8531E−05 |
| A06 | −7.2383E−08 | −6.7036E−08 | −3.7298E−06 | −2.5136E−06 | −2.0475E−07 | −2.5217E−07 |
| A08 | 8.1385E−11 | 0.0000E+00 | 1.7747E−08 | 0.0000E+00 | −7.4015E−09 | −3.7980E−09 |
| A10 | −2.5007E−14 | 0.0000E+00 | 2.4069E−11 | 0.0000E+00 | 0.0000E+00 | −4.3644E−11 |
| A12 | 0.0000E+00 | 0.0000E+00 | 0.0000E+00 | 0.0000E+00 | 0.0000E+00 | 0.0000E+00 |

Projection Image and Enlarged Image

Figure 15:
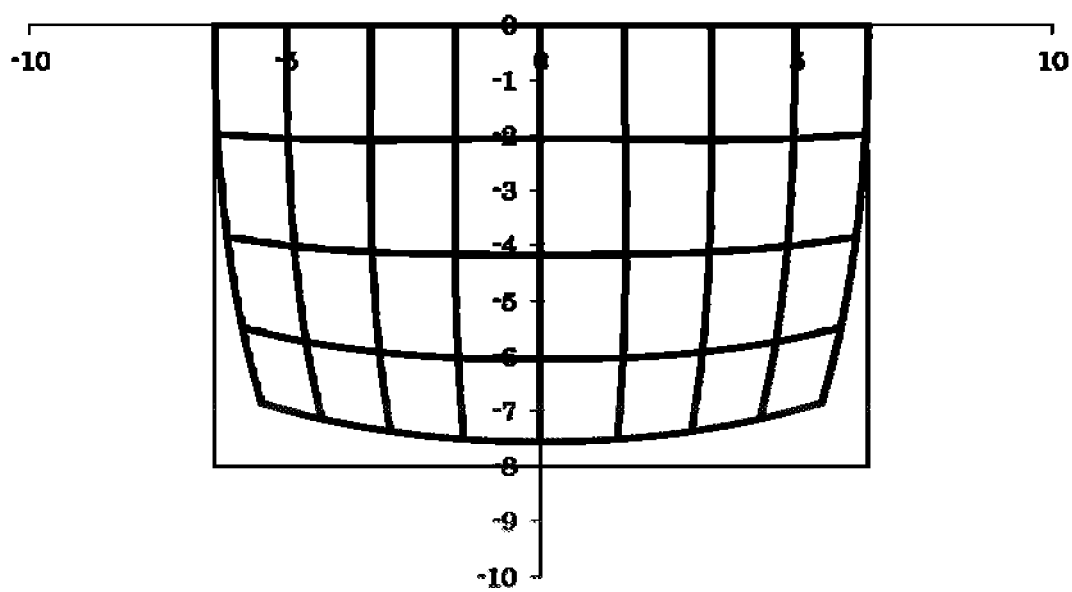
FIG. 15 describes a projection image.
Figure 16:
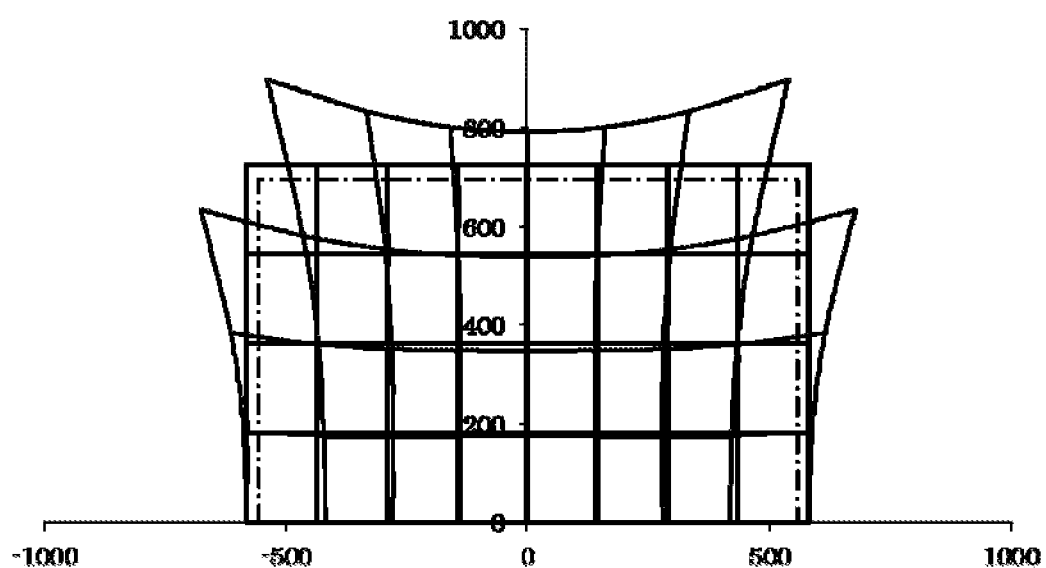
FIG. 16 describes an enlarged image generated when the projection optical system projects the projection image.

FIG. 15 describes the projection image. The thick lines in FIG. 15 conceptually represent the projection image. The thin line in FIG. 15 represents the image display area of the light modulator 18. FIG. 16 describes the enlarged image generated when the projection image is projected on the screen S via the projection optical system 3C. The thick lines in FIG. 16 conceptually represent the enlarged image generated when the projection image in FIG. 15 is projected on the screen S. The thin line in FIG. 16 conceptually represents the image display area of the light modulator 18 projected on the screen S. The chain line in FIG. 16 conceptually represents the image display area of the light modulator 18 formed when a projection optical system that produces no distortion aberration projects the image display area on the screen S.

Also in the present example, when the projection optical system 3C projects the projection image shown in FIG. on the screen S, an oblong enlarged image having no distortion is formed, as shown in FIG. 16. The projection image is compressed at the maximum image height in a lower portion of the image display area of the light modulator 18. The projection image has no field curvature. The projection optical system 3C according to the present example can generate a larger enlarged image on the screen S than the enlarged image formed by the projection optical system that has the same focal length but produces no distortion aberration, as indicated by the chain line in FIG. 16.

In FIG. 16, the reason why the two corners of the upper end of the conceptual image of the image display area of the light modulator 18 generated when the image display area is projected on the screen S are truncated is that the image height of the two corners of the upper end of the image display area of the light modulator 18 extends off the image circle of the projection optical system 3C, so that no light ray passes through the truncated portions. The projection image that is displayed in the image display area of the light modulator 18 is, however, compressed at the maximum image height in the lower portion of the image display area of the light modulator 18. The projection image is therefore not truncated.

The projection optical system 3C according to the present example satisfies Conditional Expressions (1) and (2) below:

$$0.2 < NA \quad (1)$$

$$-45\% < Dst < -10\% \quad (2)$$

where NA denotes the reduction-side numerical aperture, and Dst denotes the distortion aberration at the reduction-side maximum image height.

In the present example, NA=0.25 is satisfied, so that Conditional Expression (1) is satisfied. The projection optical system 3C can therefore efficiently capture the light flux outputted from the light modulator 18. Further, in the present example, Dst=−25.0% is satisfied, so that Conditional Expression (2) is satisfied. Deterioration of the quality of the enlarged image can therefore be avoided or suppressed in the present example. Further, in the projection optical system 3C, the diameter of the first lens L1 can be reduced, and the number of lenses that form the projection optical system 3C can be reduced.

In the present example, the first lens group LG1 includes three negative lenses. The first lens group LG1 can therefore have a sufficient back focal length and a flat image plane while producing a distortion aberration that falls within the range expressed by Conditional Expression (2).

Further, the first lens L1 and the second lens L2 each have a meniscus shape having a convex surface facing the enlargement side. The projection optical system 3C can therefore suppress comma at the periphery of the projection image and astigmatism in the projection image while having a wide angle of view, such as w=69.19.

The projection optical system 3C according to the present example next satisfies Conditional Expressions (3) and (4) below:

$$0.8<|f1/f|<2.2 \quad (3)$$

$$0.2<|f1/f23|<0.6 \quad (4)$$

where f denotes the focal length of the entire optical system, f1 denotes the focal length of the first lens group LG1, and f23 denotes the combined focal length of the combination of the second lens group LG2 and the third lens group LG3.

In the present example, f=4.800 and f1=−6.350 are satisfied. |f1/f|=1.32 is therefore satisfied, so that Conditional Expression (3) is satisfied. Further, in the present example, f23=23.553 is satisfied. |f1/f23|=0.27 is therefore satisfied, so that Conditional Expression (4) is satisfied. The projection optical system 3C can therefore correct comma and field curvature with the distortion aberration maintained at a desired value. Further, a sufficient back focal length can be ensured with a wide angle of view provided.

The projection optical system 3C further satisfies Conditional Expression (5) below:

$$4.0<f2/f<10.0 \quad (5)$$

where f2 denotes the focal length of the second lens group LG2.

In the present example, f2=24.154 is satisfied. f2/f=5.03 is therefore satisfied, so that Conditional Expression (5) is satisfied. The projection optical system 3C can therefore correct comma and astigmatism in a well-balanced manner.

The projection optical system 3C further satisfies Conditional Expressions (6) and (7) below:

$$N>1.65 \quad (6)$$

$$V<35 \quad (7)$$

where N denotes the average of the refractive indices of the positive lenses provided in the second lens group LG2, and V denotes the average of the Abbe numbers thereof.

In the present example, N=1.71 is satisfied, so that Conditional Expression (6) is satisfied. Further, V=29.77 is satisfied, so that Conditional Expression (7) is satisfied. The projection optical system 3C can therefore suppress occurrence of the chromatic aberration of magnification.

In the present example, the thirteenth lens L13, which is located in a position closest to the reduction side in the third lens group LG3, is a positive lens having a convex surface facing the reduction side. Further, the projection optical system 3C satisfies Conditional Expression (8) below:

$$2.0<f3/f<6.0 \quad (8)$$

where f3 denotes the focal length of the third lens group LG3.

In the present example, f3=18.952 is satisfied. f3/f=3.95 is therefore satisfied, so that Conditional Expression (8) is satisfied. The projection optical system 3C therefore readily ensures a sufficient back focal length and a reduction-side numerical aperture for capturing the light flux from the light modulator 18.

The first lens L1 of the first lens group LG1 is a plastic lens having aspheric surfaces on opposite sides. In the present example, since the first lens L1 is a plastic lens, aspheric surfaces is readily formed on the first lens L1. Further, since the first lens L1 has aspheric surfaces on opposite sides, the amount of distortion aberration produced in the projection optical system 3C is readily controlled.

Further, in the present example, in which the first lens L1 has aspheric surfaces on opposite sides, the number of lenses in the projection optical system 3C can be reduced, and the overall length of the projection optical system 3C can be reduced, as compared with a case where the first lens L1 has no aspheric surface. Moreover, the first lens L1 has a large ratio between the thickness of the first lens L1 in the vicinity of the optical axis and the thickness thereof at the periphery because the lens thickness changes along the two lens portions, and the first lens L1 also has a large diameter. Therefore, the first lens L1 formed of a plastic lens can be inexpensive as compared with the first lens L1 formed of a glass lens.

Figure 17:
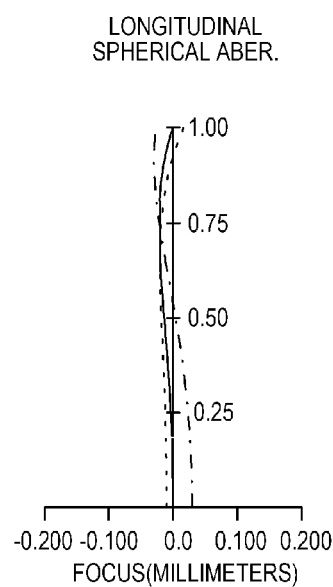
FIG. 17 is an aberration diagram when the projection distance of the projection optical system is the reference distance.
Figure 17:
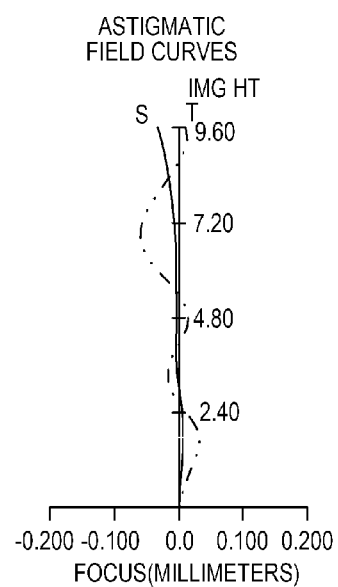
Figure 17:
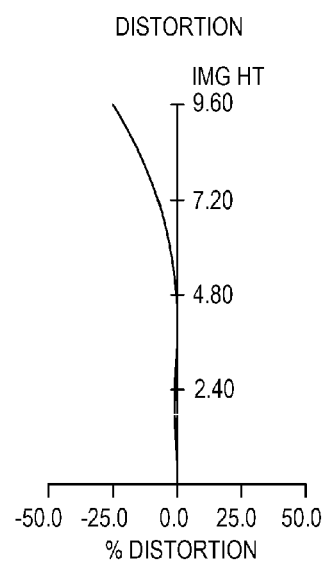
Figure 18:
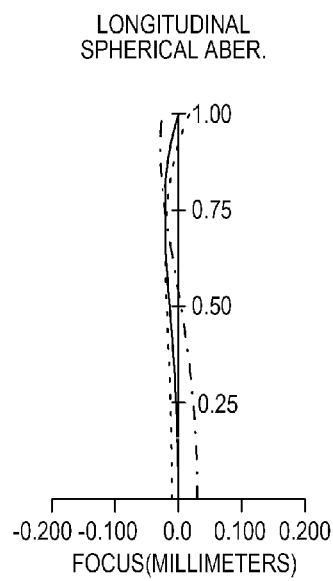
FIG. 18 is an aberration diagram when the projection distance of the projection optical system is the far-projection distance.
Figure 18:
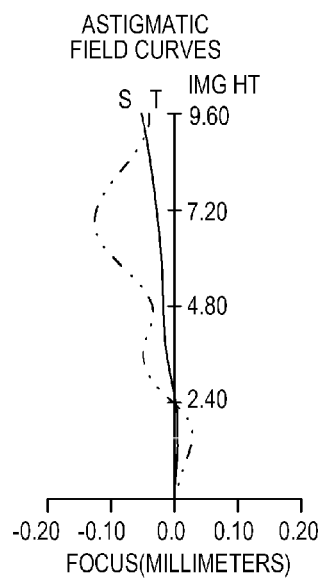
Figure 18:
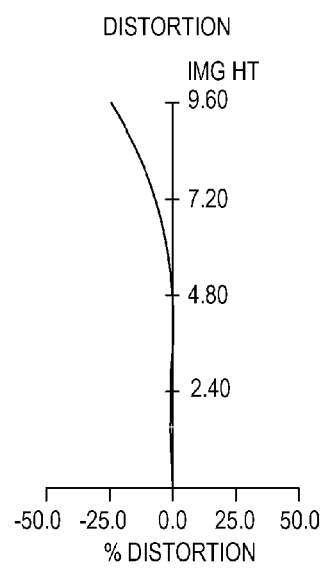
Figure 19:
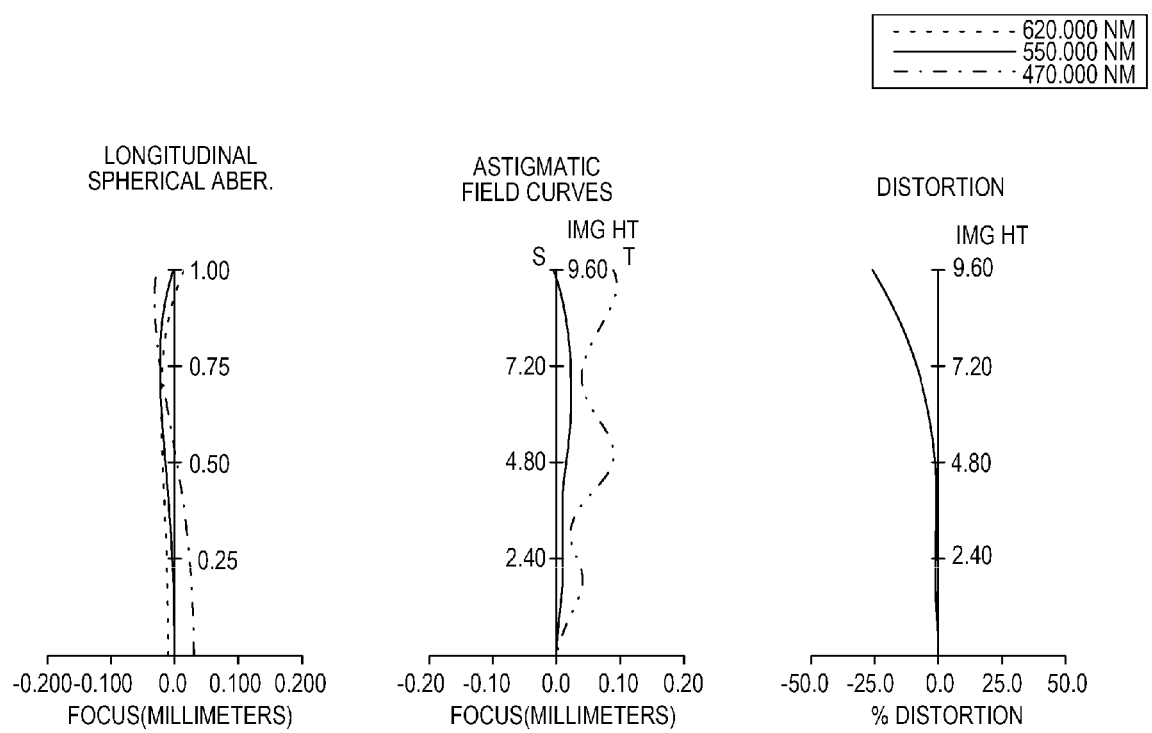
FIG. 19 is an aberration diagram when the projection distance of the projection optical system is the near-projection distance.

FIG. 17 is an aberration diagram when the projection distance of the projection optical system 3C is the reference distance. FIG. 18 is an aberration diagram when the projection distance of the projection optical system 3C is the far-projection distance. FIG. 19 is an aberration diagram when the projection distance of the projection optical system 3C is the near-projection distance. In each of the aberration diagrams of FIGS. 17 to 19, the right figure is a distortion aberration diagram, the middle figure is an astigmatism diagram, and the left figure is a spherical aberration diagram. The spherical aberration, astigmatism, and distortion aberration are satisfactorily corrected in the projection optical system 3C, as shown in the aberration diagrams of FIGS. 17 to 19.

The projection optical system 3C according to the present example forms no intermediate image therein and permits occurrence of the distortion aberration. The size of the projection optical system. 3C can therefore be reduced. On the other hand, the light modulator 18 forms a projection image having distortion that corrects the distortion aberration produced by the projection optical system 3C. The projector 1 can therefore project an enlarged image having a suppressed distortion aberration.

Example 4

Figure 20:
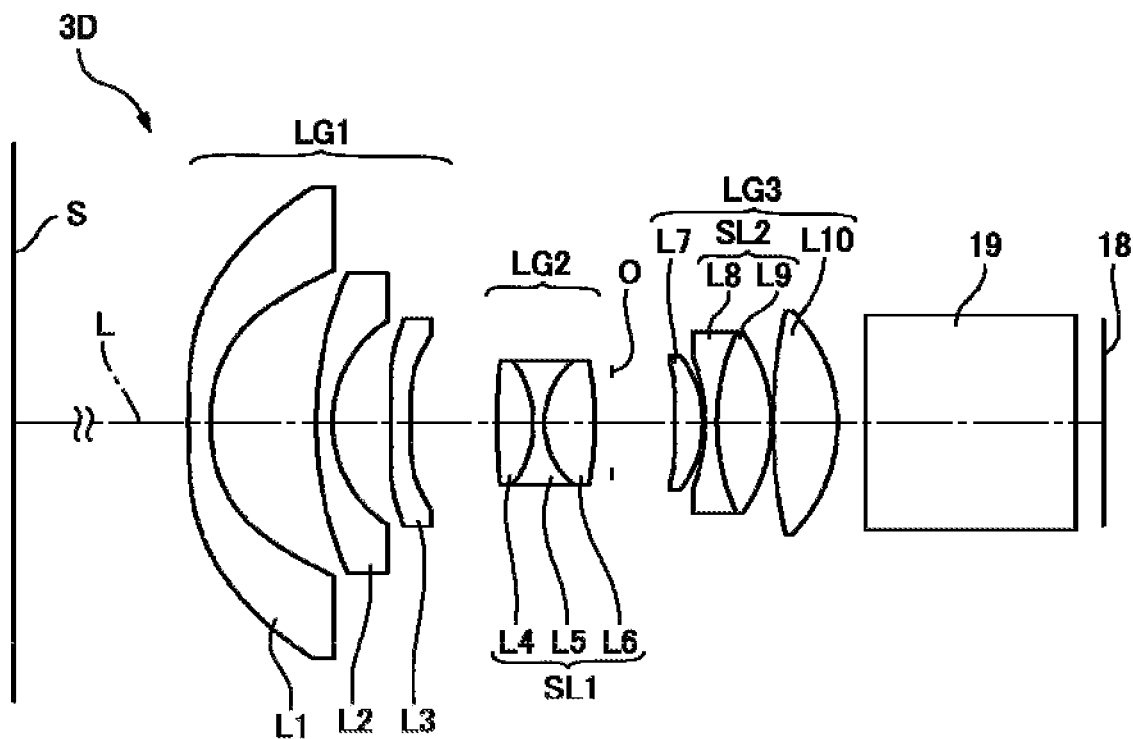
FIG. 20 is a configuration diagram of a projection optical system according to Example 4.

FIG. 20 is a configuration diagram of the projection optical system according to Example 4. A projection optical system 3D according to the present example is formed of the following components sequentially arranged from the enlargement side: a first lens group LG1 having negative power; a second lens group LG2 having positive power; an aperture stop O; and a third lens group LG3 having positive power. The projection optical system 3D includes 10 lenses in total. The projection optical system 3D includes the cross dichroic prism 19 between the light modulator 18 and a reduction-side first lens located in a position closest to the reduction side. The reduction-side first lens is the tenth lens L10. When the projection distance of the projection optical system 3D is changed, the space between the entire optical system and the cross dichroic prism 19 is changed for focusing.

The first lens group LG1 includes three negative lenses. The three negative lenses are each a single lens. In the present example, the first lens group LG1 is formed of three negative lenses. Specifically, the first lens group LG1 is formed of a first lens L1 having a convex surface facing the enlargement side and having negative power, a second lens L2 having a convex surface facing the enlargement side and having negative power, and a third lens L3 having a convex surface facing the enlargement side and having negative power. The first lens L1, the second lens L2, and the third lens L3 each have a meniscus shape. The first lens L1 is a plastic lens. One of the lenses of the first lens group LG1 has an aspheric surface facing the enlargement side. In the present example, the first lens L1 has aspheric surfaces on opposite sides. Further, the third lens L3 has aspheric surfaces on opposite sides. Moreover, the seventh lens L7 has aspheric surfaces on opposite sides.

The second lens group LG2 includes one positive lens. Specifically, the second lens group LG2 is formed of a fourth lens L4, a fifth lens L5, and a sixth lens L6. The fourth lens L4 and the sixth lens L6 are each a positive lens. The fourth lens L4, the fifth lens L5, and the sixth lens L6 form a first jointed lens SL1. The fourth lens L4 has a convex shape both on the enlargement and reduction sides. The fifth lens L5 has a concave shape both on the enlargement and reduction sides and has negative power. The sixth lens L6 has a convex shape both on the enlargement and reduction sides.

The third lens group LG3 includes a plurality of positive lenses. At least one of the plurality of positive lenses of the third lens group LG3 forms a jointed lens. Further, the tenth lens L10, which is located in a position closest to the reduction side in the third lens group LG3, is a positive lens having a convex surface facing the reduction side. In other words, the reduction-side first lens is a positive lens having a convex surface facing the reduction side. Specifically, the third lens group LG3 is formed of four lenses, the seventh lens L7, the eighth lens L8, the ninth lens L9, and the tenth lens L10. The seventh lens L7, the ninth lens L9, and the tenth lens L10 are each a positive lens. The eighth lens L8 and the ninth lens L9 form a second jointed lens SL2. The tenth lens L10 is the reduction-side first lens and is a positive lens having a convex surface facing the reduction side. More specifically, the seventh lens L7 has a meniscus shape having a convex surface facing the reduction side. The seventh lens L7 has aspheric surfaces on opposite sides. The eighth lens L8 has a concave shape both on the enlargement and reduction sides and has negative power. The ninth lens L9 has a concave shape both on the enlargement and reduction sides. The tenth lens L10 has a convex shape both on the enlargement and reduction sides.

Data on the projection optical system 3D are as follows:
f: 5.8;
FNo: 2.00; and
ω: 62.45,
where f denotes the focal length of the entire optical system, FNo denotes the f number thereof, and ω denotes the half angle of view thereof.

Data on the lenses of the projection optical system 3D are as follows.

| Lens | Surface number | R | D | nd | vd |
|---|---|---|---|---|---|
|  | 0 |  | Variable space D1 |  |  |
| 1 | 1* | 152.620 | 2.40 | 1.53116 | 56.0 |
|  | 2* | 18.617 | 11.57 |  |  |
| 2 | 3 | 40.907 | 1.80 | 1.75520 | 27.5 |
|  | 4 | 13.318 | 6.45 |  |  |
| 3 | 5* | −79.843 | 2.00 | 1.53116 | 56.0 |
|  | 6* | 63.354 | 9.56 |  |  |
| 4 | 7 | 63.155 | 4.00 | 1.69895 | 30.1 |
| 5 | 8 | −11.513 | 1.20 | 1.74400 | 44.8 |
| 6 | 9 | 8.742 | 5.50 | 1.71736 | 29.5 |
|  | 10 | −36.779 | 1.80 |  |  |
| STO |  | Infinity | 7.00 |  |  |
| 7 | 12* | −76.392 | 3.02 | 1.58913 | 61.2 |
|  | 13* | −12.149 | 0.20 |  |  |
| 8 | 14 | −20.654 | 1.30 | 1.84666 | 23.8 |
| 9 | 15 | 23.702 | 5.97 | 1.49700 | 81.5 |
|  | 16 | −17.014 | 0.20 |  |  |
| 10 | 17 | 58.689 | 7.03 | 1.48749 | 70.2 |
|  | 18 | −17.508 | Variable space D2 |  |  |
| 19 | 19 | Infinity | 23.00 | 1.51633 | 64.1 |
|  | 20 | Infinity | 3.00 |  |  |

The variable spaces 1 and 2 are set as follows in the focusing performed when the projection distance is changed.

|  | Reference distance | Far-projection distance | Near-projection distance |
|---|---|---|---|
| Variable space D1 | 500.00 | 1000.00 | 300.00 |
| Variable space D2 | 3.07 | 3.03 | 3.11 |

Data on the aspheric surfaces of the first lens L1 labeled with the surface numbers 1 and 2, the aspheric surfaces of the third lens L3 labeled with the surface numbers 5 and 6, and the aspheric surfaces of the seventh lens L7 labeled with the surface numbers 12 and 13 are as follows.

| Surface number | 1 | 2 | 5 | 6 | 12 | 13 |
|---|---|---|---|---|---|---|
| k | 0.0000 | 0.0000 | 0.0000 | −1.0000 | −1.0000 | −0.3517 |
| A04 | 5.5511E−05 | 2.3257E−05 | 2.1301E−04 | 2.6592E−04 | −1.2795E−04 | 5.7043E−06 |
| A06 | −7.4822E−08 | 3.3210E−07 | −6.4287E−07 | −5.9629E−07 | −1.8897E−07 | −5.7737E−07 |
| A08 | 4.5157E−11 | −9.7939E−10 | 1.2866E−10 | 2.0815E−09 | −2.5335E−08 | −4.1770E−09 |
| A10 | 0.0000E+00 | 0.0000E+00 | 1.2352E−13 | −3.9673E−11 | 2.3883E−11 | −1.6847E−10 |
| A12 | 0.0000E+00 | 0.0000E+00 | 0.0000E+00 | 0.0000E+00 | 0.0000E+00 | 0.0000E+00 |

Projection Image and Enlarged Image

Figure 21:
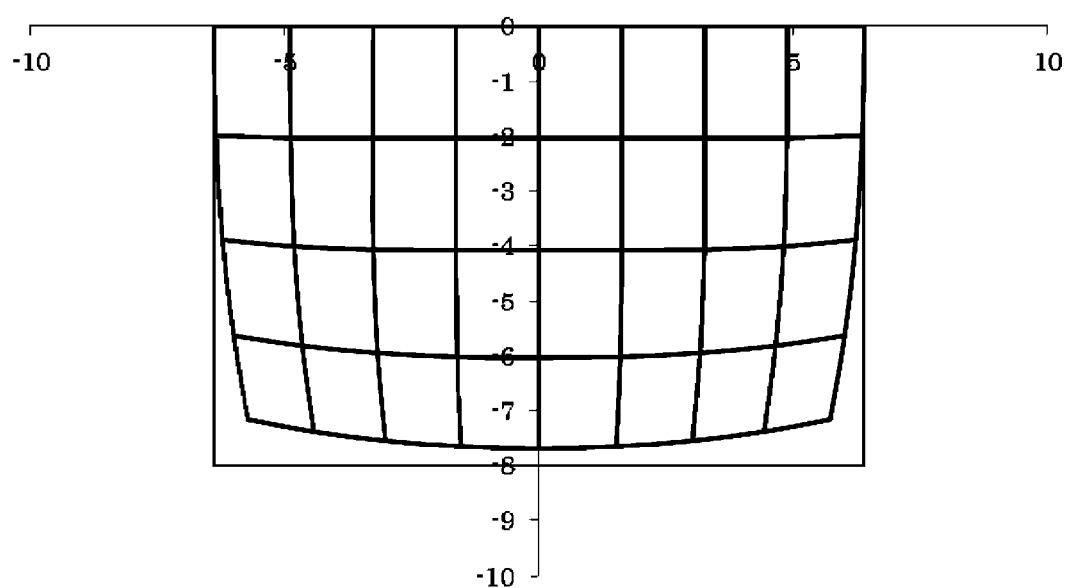
FIG. 21 describes a projection image.
Figure 22:
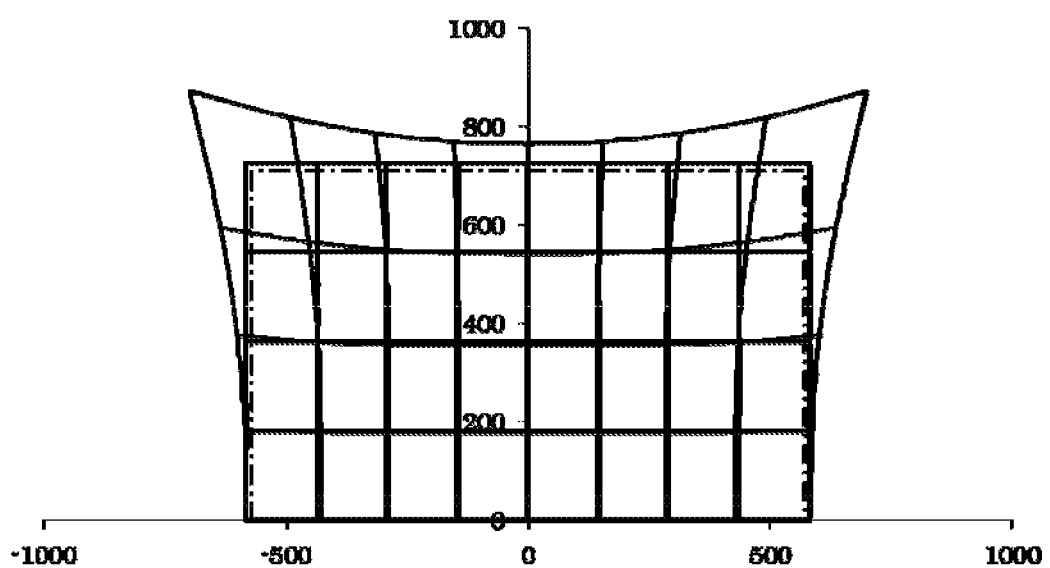
FIG. 22 describes an enlarged image generated when the projection optical system projects the projection image.

FIG. 21 describes the projection image. The thick lines in FIG. 21 conceptually represent the projection image. The thin line in FIG. 21 represents the image display area of the light modulator 18. FIG. 22 describes the enlarged image generated when the projection image is projected on the screen S via the projection optical system 3D. The thick lines in FIG. 22 conceptually represent the enlarged image generated when the projection image in FIG. 21 is projected on the screen S. The thin line in FIG. 22 conceptually represents the image display area of the light modulator 18 projected on the screen S. The chain line in FIG. 22 conceptually represents the image display area of the light modulator 18 formed when a projection optical system that produces no distortion aberration projects the image display area on the screen S.

Also in the present example, when the projection optical system 3D projects the projection image shown in FIG. on the screen S, an oblong enlarged image having no distortion is formed, as shown in FIG. 22. The projection image is compressed at the maximum image height in a lower portion of the image display area of the light modulator 18. The projection image has no field curvature. The projection optical system 3D according to the present example can generate a larger enlarged image on the screen S than the enlarged image formed by the projection optical system that has the same focal length but produces no distortion aberration, as indicated by the chain line in FIG. 22.

The projection optical system 3D according to the present example satisfies Conditional Expressions (1) and (2) below:

$$0.2 < NA \qquad (1)$$

$$-45\% < Dst < -10\% \qquad (2)$$

where NA denotes the reduction-side numerical aperture, and Dst denotes the distortion aberration at the reduction-side maximum image height.

In the present example, NA=0.25 is satisfied, so that Conditional Expression (1) is satisfied. The projection optical system 3D can therefore efficiently capture the light flux outputted from the light modulator 18. Further, in the present example, Dst=−14.5% is satisfied, so that Conditional Expression (2) is satisfied. Deterioration of the quality of the enlarged image can therefore be avoided or suppressed in the present example. Further, in the projection optical system 3D, the diameter of the first lens L1 can be reduced, and the number of lenses that form the projection optical system 3D can be reduced.

In the present example, the first lens group LG1 includes three negative lenses. The first lens group LG1 can therefore have a sufficient back focal length and a flat image plane while producing a distortion aberration that falls within the range expressed by Conditional Expression (2).

Further, the first lens L1 and the second lens L2 each have a meniscus shape having a convex surface facing the enlargement side. The projection optical system 3D can therefore suppress comma at the periphery of the projection image and astigmatism in the projection image while having a wide angle of view, such as w=62.45.

The projection optical system 3D according to the present example next satisfies Conditional Expressions (3) and (4) below:

$$0.8 < |f1/f| < 2.2 \qquad (3)$$

$$0.2 < |f1/f23| < 0.6 \qquad (4)$$

where f denotes the focal length of the entire optical system, f1 denotes the focal length of the first lens group LG1, and f23 denotes the combined focal length of the combination of the second lens group LG2 and the third lens group LG3.

In the present example, f=5.800 and f1=−9.792 are satisfied. |f1/f|=1.69 is therefore satisfied, so that Conditional Expression (3) is satisfied. Further, in the present example, f23=20.179 is satisfied. |f1/f23|=0.49 is therefore satisfied, so that Conditional Expression (4) is satisfied. The projection optical system 3D can therefore correct comma and field curvature with the distortion aberration maintained at a desired value. Further, a sufficient back focal length can be ensured with a wide angle of view provided.

The projection optical system 3D further satisfies Conditional Expression (5) below:

$$4.0 < f2/f < 10.0 \qquad (5)$$

where f2 denotes the focal length of the second lens group LG2.

In the present example, f2=42.716 is satisfied. f2/f=7.36 is therefore satisfied, so that Conditional Expression (5) is satisfied. The projection optical system 3D can therefore correct comma and astigmatism in a well-balanced manner.

The projection optical system 3D further satisfies Conditional Expressions (6) and (7) below:

$$N > 1.65 \qquad (6)$$

$$V < 35 \qquad (7)$$

where N denotes the average of the refractive indices of the positive lenses provided in the second lens group LG2, and V denotes the average of the Abbe numbers thereof.

In the present example, N=1.71 is satisfied, so that Conditional Expression (6) is satisfied. Further, V=29.83 is satisfied, so that Conditional Expression (7) is satisfied. The projection optical system 3D can therefore suppress occurrence of the chromatic aberration of magnification.

In the present example, the tenth lens L10, which is located in a position closest to the reduction side in the third lens group LG3, is a positive lens having a convex surface facing the reduction side. Further, the projection optical system 3D satisfies Conditional Expression (8) below:

$$2.0 < f3/f < 6.0 \qquad (8)$$

where f3 denotes the focal length of the third lens group LG3.

In the present example, f3=19.455 is satisfied. f3/f=3.35 is therefore satisfied, so that Conditional Expression (8) is satisfied. The projection optical system 3D therefore readily ensures a sufficient back focal length and a reduction-side numerical aperture for capturing the light flux from the light modulator 18.

The first lens L1 of the first lens group LG1 is a plastic lens having aspheric surfaces on opposite sides. In the present example, since the first lens L1 is a plastic lens, aspheric surfaces is readily formed on the first lens L1. Further, since the first lens L1 has aspheric surfaces on opposite sides, the amount of distortion aberration produced in the projection optical system 3C is readily controlled. Moreover, the number of lenses in the projection optical system 3D can be reduced, and the overall length of the projection optical system 3D can be reduced. Further, the first lens L1 can be inexpensive.

Figure 23:
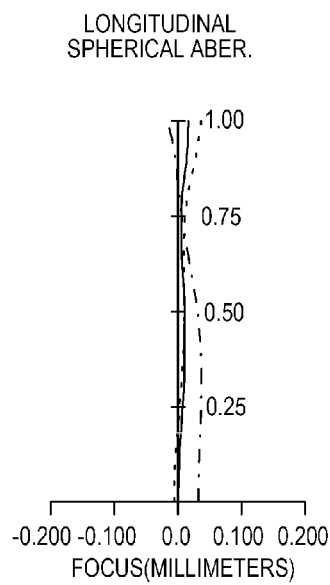
FIG. 23 is an aberration diagram when the projection distance of the projection optical system is the reference distance.
Figure 23:
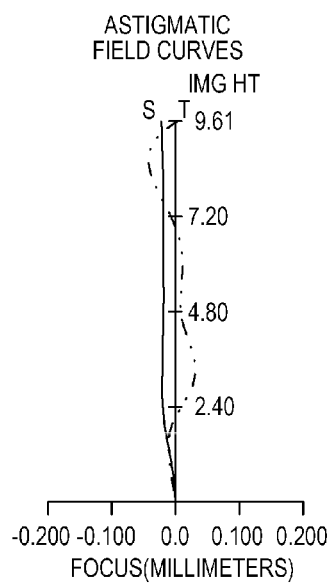
Figure 23:
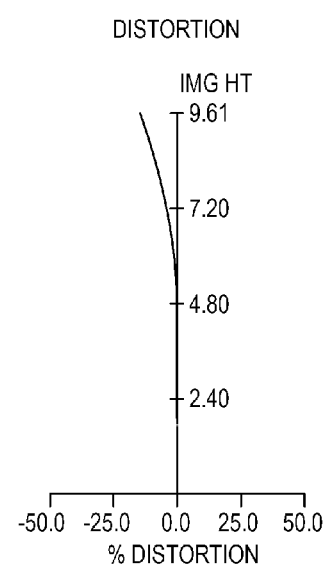
Figure 24:
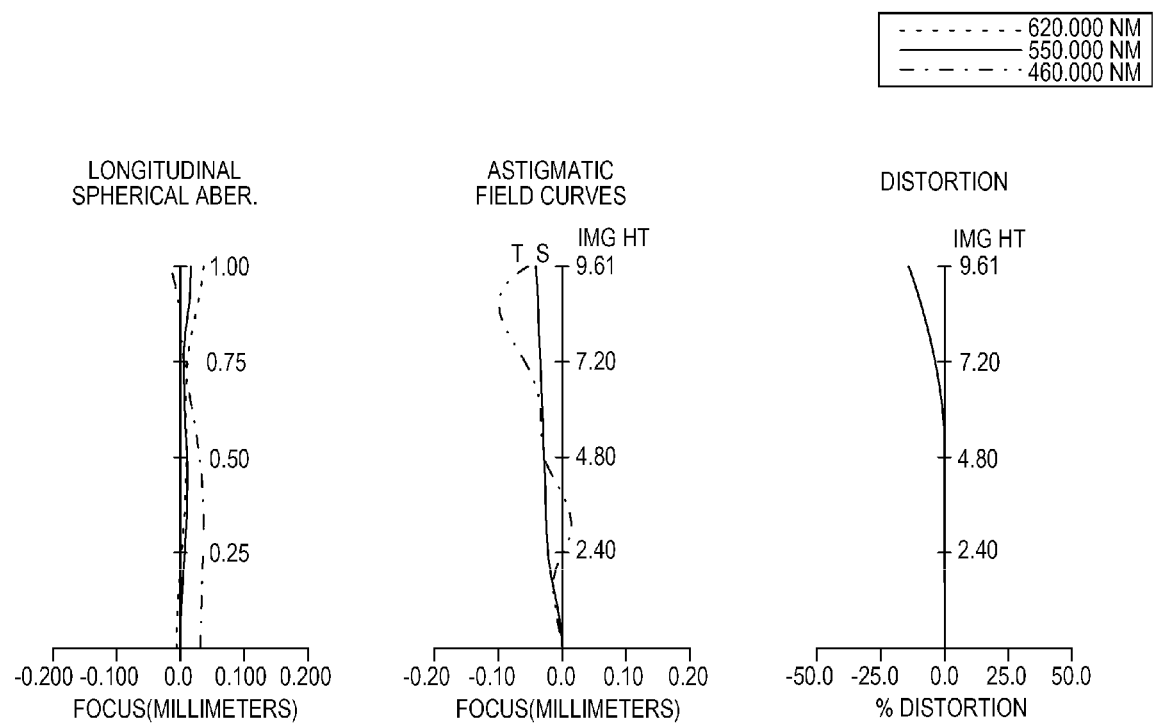
FIG. 24 is an aberration diagram when the projection distance of the projection optical system is the far-projection distance.
Figure 25:
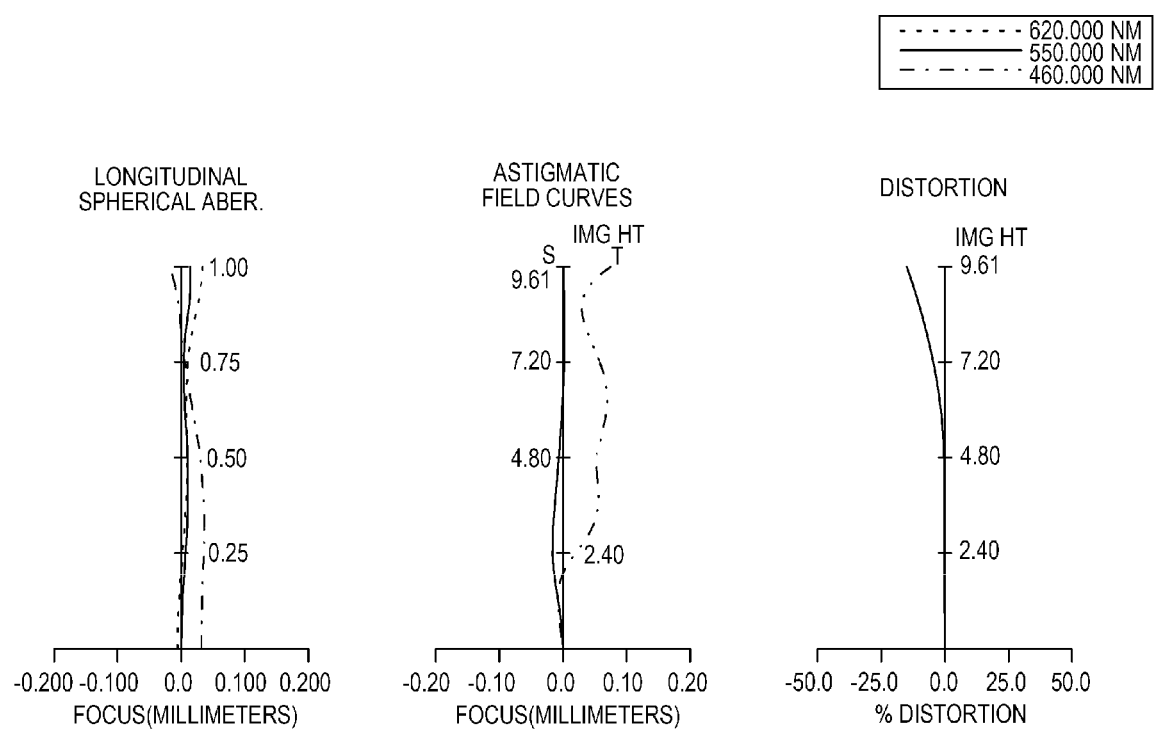
FIG. 25 is an aberration diagram when the projection distance of the projection optical system is the near-projection distance.

FIG. 23 is an aberration diagram when the projection distance of the projection optical system 3D is the reference distance. FIG. 24 is an aberration diagram when the projection distance of the projection optical system 3D is the far-projection distance. FIG. 25 is an aberration diagram when the projection distance of the projection optical system 3D is the near-projection distance. In each of the aberration diagrams of FIGS. 23 to 25, the right figure is a distortion aberration diagram, the middle figure is an astigmatism diagram, and the left figure is a spherical aberration diagram. The spherical aberration, astigmatism, and distortion aberration are satisfactorily corrected in the projection optical system 3D, as shown in the aberration diagrams of FIGS. 23 to 25.

The projection optical system 3D according to the present example forms no intermediate image therein and permits occurrence of the distortion aberration. The size of the projection optical system. 3D can therefore be reduced. On the other hand, the light modulator 18 forms a projection image having distortion that corrects the distortion aberration produced by the projection optical system 3D. The projector 1 can therefore project an enlarged image having a suppressed distortion aberration.

Example 5

Figure 26:
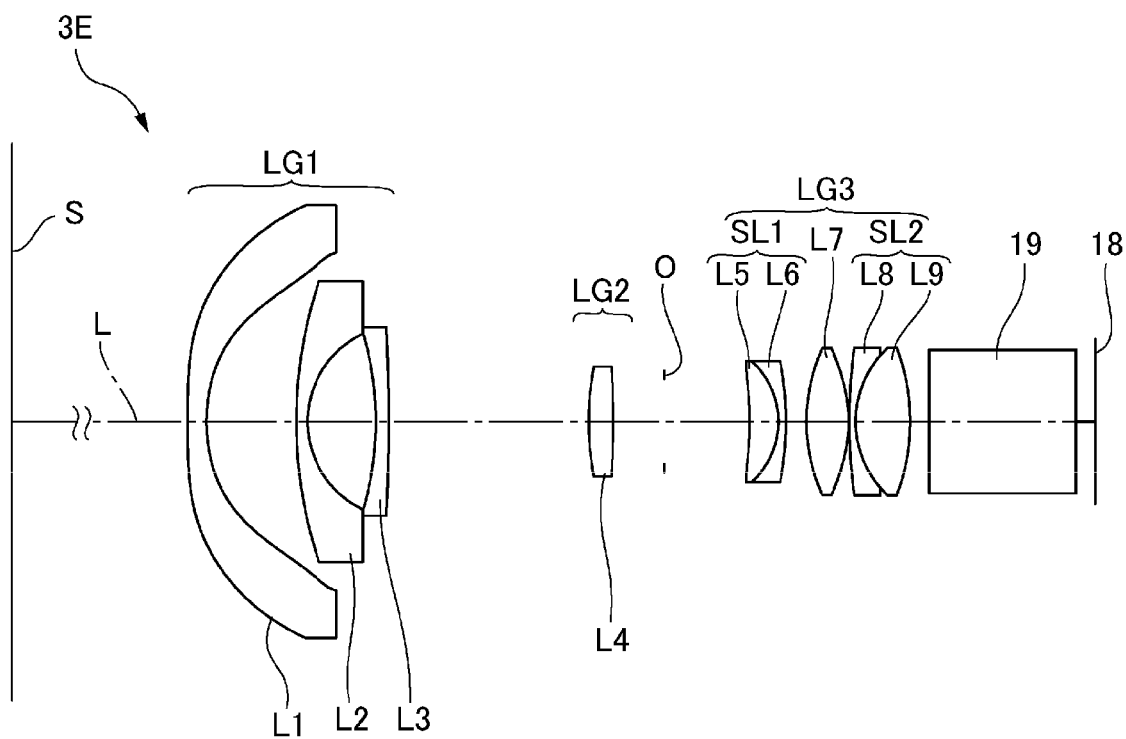
FIG. 26 is a configuration diagram of a projection optical system according to Example 5.

FIG. 26 is a configuration diagram of the projection optical system according to Example 5. A projection optical system 3E according to the present example is formed of the following components sequentially arranged from the enlargement side: a first lens group LG1 having negative power; a second lens group LG2 having positive power; an aperture stop O; and a third lens group LG3 having positive power. The projection optical system 3E includes 9 lenses in total. The projection optical system. 3E includes the cross dichroic prism 19 between the light modulator 18 and a reduction-side first lens located in a position closest to the reduction side. The reduction-side first lens is the ninth lens L9. When the projection distance of the projection optical system 3E is changed, the space between the first lens group LG1 and the second lens group LG2 is changed for focusing.

The first lens group LG1 includes three negative lenses. The three negative lenses are each a single lens. In the present example, the first lens group LG1 is formed of three negative lenses. Specifically, the first lens group LG1 is formed of a first lens L1 having a convex surface facing the enlargement side and having negative power, a second lens L2 having a convex surface facing the enlargement side and having negative power, and a third lens L3 having a convex surface facing the enlargement side and having negative power. The first lens L1, the second lens L2, and the third lens L3 each have a meniscus shape. The first lens L1 is a plastic lens. One of the lenses of the first lens group LG1 has an aspheric surface facing the enlargement side. In the present example, the first lens L1 has aspheric surfaces on opposite sides.

The second lens group LG2 includes one positive lens. In the present example, the second lens group LG2 is formed of a fourth lens L4 having a convex shape both on the enlargement and reduction sides and having positive power.

The third lens group LG3 includes a plurality of positive lenses. At least one of the plurality of positive lenses of the third lens group LG3 forms a jointed lens. Further, the ninth lens L9, which is located in a position closest to the reduction side in the third lens group LG3, is a positive lens having a convex surface facing the reduction side. In other words, the reduction-side first lens is a positive lens having a convex surface facing the reduction side. Specifically, the third lens group LG3 is formed of five lenses, the fifth lens L5, the sixth lens L6, the seventh lens L7, the eighth lens L8, and the ninth lens L9. The fifth lens L5, seventh lens L7, and the ninth lens L9 are each a positive lens. The fifth lens L5 and the sixth lens L6 form a first jointed lens SL1. The eighth lens L8 and the ninth lens L9 form a second jointed lens SL2. More specifically, the fifth lens L5 has a meniscus shape having a convex surface facing the reduction side. The sixth lens L6 has a meniscus shape having a convex surface facing the reduction side and has negative power. The seventh lens L7 has a concave shape both on the enlargement and reduction sides. The seventh lens L7 has aspheric surfaces on opposite sides. The eighth lens L8 has a meniscus shape having a convex surface facing the enlargement side and has negative power. The ninth lens L9 has a concave shape both on the enlargement and reduction sides.

Data on the projection optical system 3E are as follows:
f: 5.18;
FNo: 2.00; and
ω: 67.70,
where f denotes the focal length of the entire optical system, FNo denotes the f number thereof, and ω denotes the half angle of view thereof.

Data on the lenses of the projection optical system 3E are as follows.

| Lens | Surface number | R | D | nd | vd |
|---|---|---|---|---|---|
| | 0 | | Variable space D1 | | |
| 1 | 1* | 201.858 | 3.00 | 1.53116 | 56.0 |
| | 2* | 26.632 | 14.01 | | |
| 2 | 3 | 68.810 | 1.80 | 1.85150 | 40.8 |
| | 4 | 15.146 | 10.67 | | |
| 3 | 5 | −49.175 | 2.00 | 1.84666 | 23.8 |
| | 6 | −291.448 | Variable space D2 | | |
| 4 | 7 | 44.620 | 3.80 | 1.84666 | 23.8 |
| | 8 | −164.721 | 8.00 | | |
| STO | 9 | Infinity | 13.29 | | |
| 5 | 10 | −63.936 | 4.50 | 1.48749 | 70.2 |
| 6 | 11 | −12.748 | 1.20 | 1.85150 | 40.8 |
| | 12 | −49.090 | 3.19 | | |
| 7 | 13* | 25.453 | 6.60 | 1.49700 | 81.5 |
| | 14* | −21.798 | 0.10 | | |
| 8 | 15 | 85.491 | 1.00 | 1.85025 | 30.1 |
| 9 | 16 | 15.706 | 8.50 | 1.59522 | 67.7 |
| | 17 | −32.547 | 3.00 | | |
| 19 | 18 | Infinity | 23.00 | 1.51633 | 64.1 |
| | 19 | Infinity | 3.00 | | |

The variable spaces 1 and 2 are set as follows in the focusing performed when the projection distance is changed.

| | Reference distance | Far-projection distance | Near-projection distance |
|---|---|---|---|
| Variable space D1 | 400.00 | 1000.00 | 200.00 |
| Variable space D2 | 31.23 | 31.10 | 31.44 |

Data on the aspheric surfaces of the first lens L1 labeled with the surface numbers 1 and 2 and the aspheric surfaces of the seventh lens L7 labeled with the surface numbers 13 and 14 are as follows.

| Surface number | 1 | 2 | 13 | 14 |
|---|---|---|---|---|
| k | −1.0000 | 0.0000 | −0.1906 | −3.3181 |
| A04 | 2.0387E−05 | 9.3050E−06 | −2.2445E−05 | −1.2712E−05 |
| A06 | −1.4715E−08 | 5.6709E−08 | 9.7313E−08 | 8.4564E−08 |

-continued

| Surface number | 1 | 2 | 13 | 14 |
|---|---|---|---|---|
| A08 | 5.0859E−12 | −1.1147E−10 | −1.3733E−10 | −3.8970E−11 |
| A10 | 1.2408E−15 | 0.0000E+00 | 0.0000E+00 | 0.0000E+00 |
| A12 | 0.0000E+00 | 0.0000E+00 | 0.0000E+00 | 0.0000E+00 |

Projection Image and Enlarged Image

Figure 27:
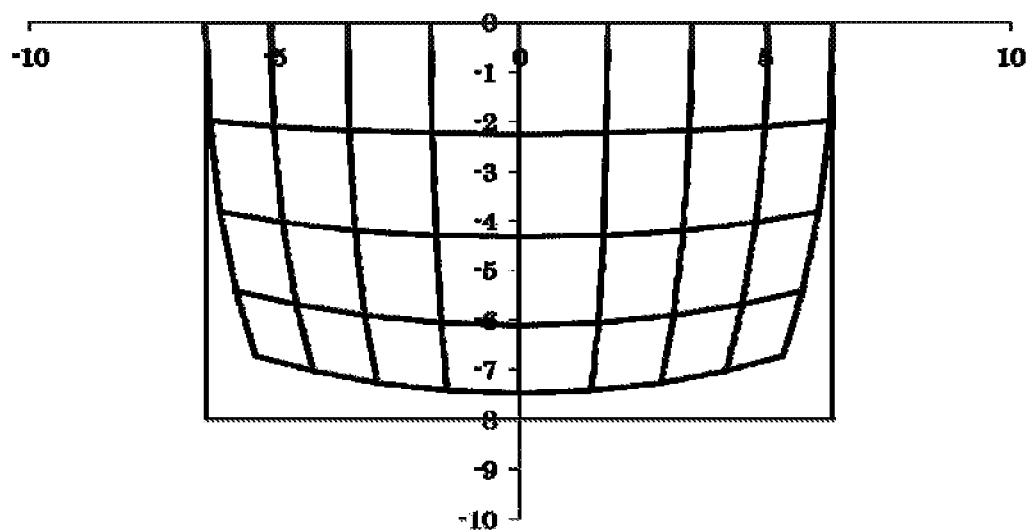
FIG. 27 describes a projection image.
Figure 28:
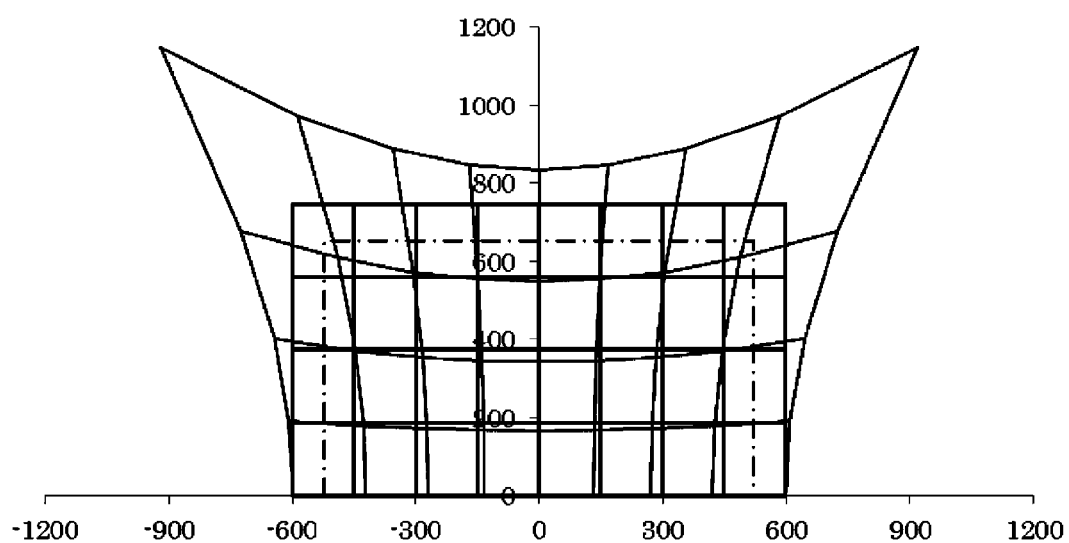
FIG. 28 describes an enlarged image generated when the projection optical system projects the projection image.

FIG. 27 describes the projection image. The thick lines in FIG. 27 conceptually represent the projection image. The thin line in FIG. 27 represents the image display area of the light modulator 18. FIG. 28 describes the enlarged image generated when the projection image is projected on the screen S via the projection optical system 3E. The thick lines in FIG. 28 conceptually represent the enlarged image generated when the projection image in FIG. 27 is projected on the screen S. The thin line in FIG. 28 conceptually represents the image display area of the light modulator 18 projected on the screen S. The chain line in FIG. 28 conceptually represents the image display area of the light modulator 18 formed when a projection optical system that produces no distortion aberration projects the image display area on the screen S.

Also in the present example, when the projection optical system 3E projects the projection image shown in FIG. on the screen S, an oblong enlarged image having no distortion is formed, as shown in FIG. 28. The projection image is compressed at the maximum image height in a lower portion of the image display area of the light modulator 18. The projection image has no field curvature. The projection optical system 3E according to the present example can generate a larger enlarged image on the screen S than the enlarged image formed by the projection optical system that has the same focal length but produces no distortion aberration, as indicated by the chain line in FIG. 28.

The projection optical system 3E according to the present example satisfies Conditional Expressions (1) and (2) below:

$$0.2<NA \quad (1)$$

$$-45\%<Dst<-10\% \quad (2)$$

where NA denotes the reduction-side numerical aperture, and Dst denotes the distortion aberration at the reduction-side maximum image height.

In the present example, NA=0.25 is satisfied, so that Conditional Expression (1) is satisfied. The projection optical system 3E can therefore efficiently capture the light flux outputted from the light modulator 18. Further, in the present example, Dst=−30.0% is satisfied, so that Conditional Expression (2) is satisfied. Deterioration of the quality of the enlarged image can therefore be avoided or suppressed in the present example. Further, in the projection optical system 3E, the diameter of the first lens L1 can be reduced, and the number of lenses that form the projection optical system 3E can be reduced.

In the present example, the first lens group LG1 includes three negative lenses. The first lens group LG1 can therefore have a sufficient back focal length and a flat image plane while producing a distortion aberration that falls within the range expressed by Conditional Expression (2).

Further, the first lens L1 and the second lens L2 each have a meniscus shape having a convex surface facing the enlargement side. The projection optical system 3E can therefore suppress comma at the periphery of the projection image and astigmatism in the projection image while having a wide angle of view, such as w=67.70.

The projection optical system 3E according to the present example next satisfies Conditional Expressions (3) and (4) below:

$$0.8<|f1/f|<2.2 \quad (3)$$

$$0.2<|f1/f23|<0.6 \quad (4)$$

where f denotes the focal length of the entire optical system, f1 denotes the focal length of the first lens group LG1, and f23 denotes the combined focal length of the combination of the second lens group LG2 and the third lens group LG3.

In the present example, f=5.182 and f1=−9.949 are satisfied. |f1/f|=1.92 is therefore satisfied, so that Conditional Expression (3) is satisfied. Further, in the present example, f23=35.919 is satisfied. |f1/f23|=0.28 is therefore satisfied, so that Conditional Expression (4) is satisfied. The projection optical system 3E can therefore correct comma and field curvature with the distortion aberration maintained at a desired value. Further, a sufficient back focal length can be ensured with a wide angle of view provided.

The projection optical system 3E further satisfies Conditional Expression (5) below:

$$4.0<f2/f<10.0 \quad (5)$$

where f2 denotes the focal length of the second lens group LG2.

In the present example, f2=41.451 is satisfied. f2/f=8.00 is therefore satisfied, so that Conditional Expression (5) is satisfied. The projection optical system 3E can therefore correct comma and astigmatism in a well-balanced manner.

The projection optical system 3E further satisfies Conditional Expressions (6) and (7) below:

$$N>1.65 \quad (6)$$

$$V<35 \quad (7)$$

where N denotes the average of the refractive indices of the positive lenses provided in the second lens group LG2, and V denotes the average of the Abbe numbers thereof.

In the present example, N=1.76 is satisfied, so that Conditional Expression (6) is satisfied. Further, V=26.52 is satisfied, so that Conditional Expression (7) is satisfied. The projection optical system 3E can therefore suppress occurrence of the chromatic aberration of magnification.

In the present example, the ninth lens L9, which is located in a position closest to the reduction side in the third lens group LG3, is a positive lens having a convex surface facing the reduction side. Further, the projection optical system 3E satisfies Conditional Expression (8) below:

$$2.0<f3/f<6.0 \quad (8)$$

where f3 denotes the focal length of the third lens group LG3.

In the present example, f3=25.832 is satisfied. f3/f=4.99 is therefore satisfied, so that Conditional Expression (8) is satisfied. The projection optical system 3E therefore readily ensures a sufficient back focal length and a reduction-side numerical aperture for capturing the light flux from the light modulator 18.

In the projection optical system 3E, the space between the first lens group LG1 and the second lens group LG2 and the space between the second lens group LG2 and the third lens group LG3 are so set as to be longer than those in the other examples. The overall length of the projection optical system 3E is therefore longer than those in the other examples. Increasing the spaces between the lens groups LG1, LG2, and LG3, however, allows reduction in power of each of the lenses that form the projection optical system 3E. As a result, the second lens group LG2 can be formed only of a single positive lens. When the spaces between the lens groups LG1, LG2, and LG3 are increased, optical path deflectors, such as mirrors, can be disposed between the lens groups LG1, LG2, and LG3 to readily change the projection directions.

Figure 29:
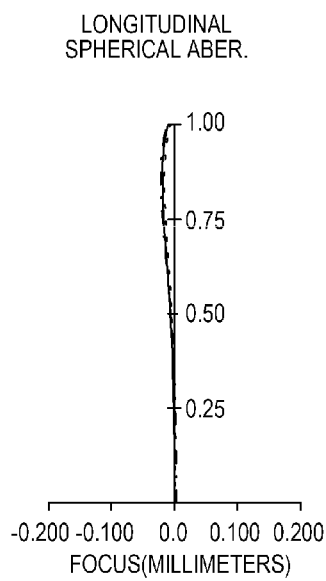
FIG. 29 is an aberration diagram when the projection distance of the projection optical system is the reference distance.
Figure 29:
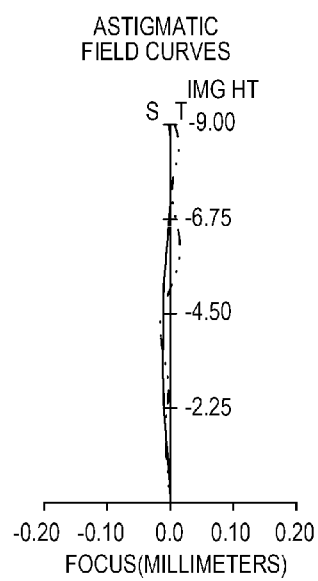
Figure 29:
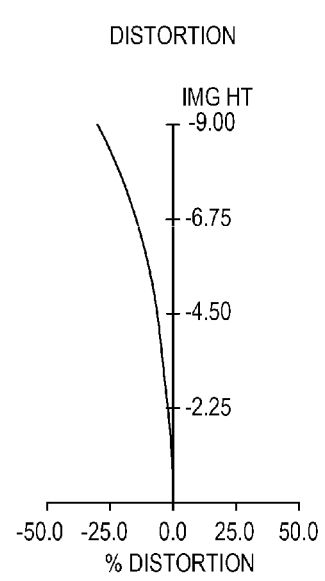
Figure 30:
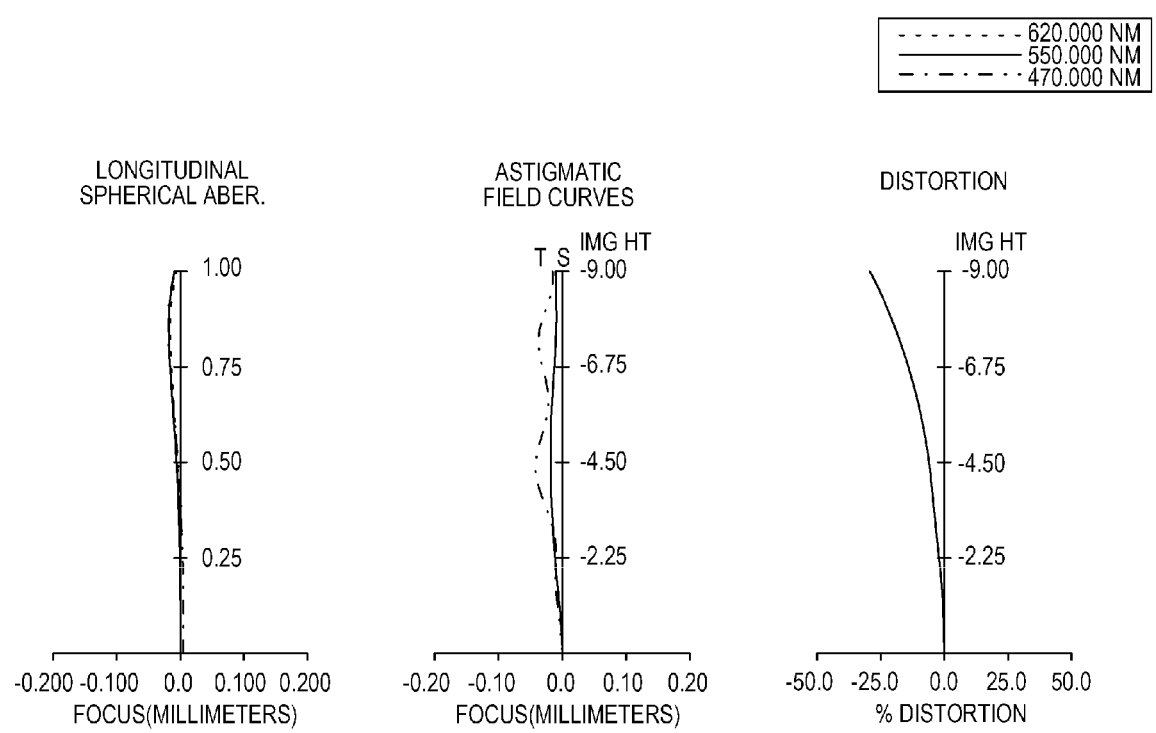
FIG. 30 is an aberration diagram when the projection distance of the projection optical system is the far-projection distance.
Figure 31:
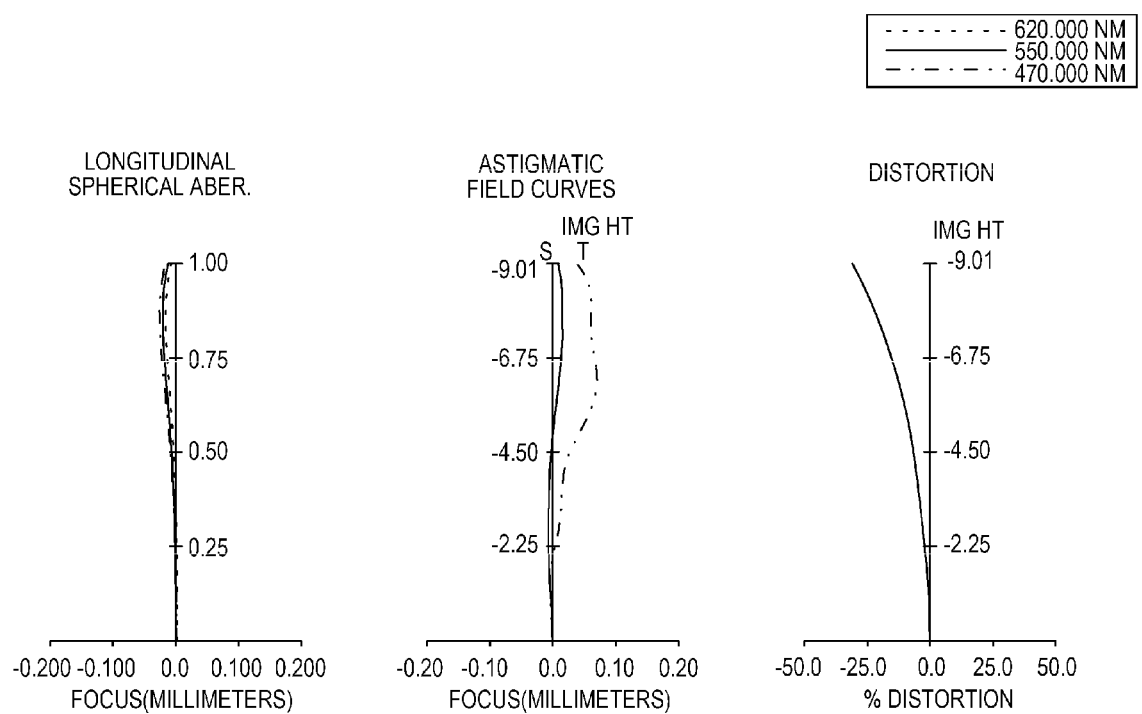
FIG. 31 is an aberration diagram when the projection distance of the projection optical system is the near-projection distance.

FIG. 29 is an aberration diagram when the projection distance of the projection optical system 3E is the reference distance. FIG. 30 is an aberration diagram when the projection distance of the projection optical system 3E is the far-projection distance. FIG. 31 is an aberration diagram when the projection distance of the projection optical system 3E is the near-projection distance. In each of the aberration diagrams of FIGS. 29 to 31, the right figure is a distortion aberration diagram, the middle figure is an astigmatism diagram, and the left figure is a spherical aberration diagram. The spherical aberration, astigmatism, and distortion aberration are satisfactorily corrected in the projection optical system 3E, as shown in the aberration diagrams of FIGS. 29 to 31.

The projection optical system 3E according to the present example forms no intermediate image therein and permits occurrence of the distortion aberration. The size of the projection optical system 3E can therefore be reduced. On the other hand, the light modulator 18 forms a projection image having distortion that corrects the distortion aberration produced by the projection optical system 3E. The projector 1 can therefore project an enlarged image having a suppressed distortion aberration.

What is claimed is:

1. A projection optical system comprising:
   a first lens group having negative power and including at least three negative lenses;
   a second lens group having positive power and including at least one positive lens, the second lens group disposed at a reduction side of the first lens group; and
   a third lens group having positive power and including a plurality of positive lenses, the third lens group disposed at the reduction side of the second lens group,
   wherein the at least three negative lenses of the first lens group are each a single lens,
   the third lens group includes a jointed lens including at least one of the plurality of positive lenses, and NA is a reduction-side numerical aperture, Dst is a distortion aberration at a reduction-side maximum image height, and the projection optical system satisfies Conditional Expressions (1) and (2) below:

$$0.2 < NA \quad (1)$$

$$-45\% < Dst < -10\% \quad (2).$$

2. The projection optical system according to claim 1, wherein f is a focal length of the entire projection optical system, f1 is a focal length of the first lens group, f23 is a combined focal length of a combination of the second lens group and the third lens group, and the projection optical system satisfies Conditional Expressions (3) and (4) below:

$$0.8 < |f1/f| < 2.2 \quad (3)$$

$$0.2 < |f1/f23| < 0.6 \quad (4).$$

3. The projection optical system according to claim 1, wherein f2 is a focal length of the second lens group, N is an average of refractive indices of the positive lenses included in the second lens group, V is an average of Abbe numbers, and the projection optical system satisfies Conditional Expression (5), (6), and (7) below:

$$4.0 < f2/f < 10.0 \quad (5)$$

$$N > 1.65 \quad (6)$$

$$V < 35 \quad (7)$$

4. The projection optical system according to claim 1,
   wherein the third lens group includes a reduction-side first lens arranged on a position closest to the reduction side,
   the reduction-side first lens is a positive lens having a convex surface facing the reduction side, and
   f3 is a focal length of the third lens group, and the projection optical system satisfies Conditional Expression (8) below:

$$2.0 < f3/f < 6.0 \quad (8)$$

5. The projection optical system according to claim 1, wherein one of the lenses included in the first lens group has an aspheric surface facing an enlargement side.

6. A projector comprising:
   the projection optical system according to claim 1;
   a light source; and
   a light modulator disposed in a reduction-side conjugate plane of the projection optical system, the light modulator modulating light emitted from the light source to form a projection image having distortion which corrects a distortion aberration generated in the projection optical system,
   wherein the projector projects an enlarged image in which the distortion aberration is corrected to an enlargement-side conjugate plane of the projection optical system.

* * * * *